United States Patent [19]

Kobatake et al.

[11] Patent Number: 5,001,705

[45] Date of Patent: Mar. 19, 1991

[54] PROTOCOL CONTROL CIRCUIT FOR DATA BUS SYSTEM

[75] Inventors: Syozo Kobatake; Hideaki Shirai, both of Kawasaki; Hideo Ohwada, Fuchu; Koji Yoshitomi, Yokohama, all of Japan

[73] Assignee: Fujitsu Limited, Kawasaki, Japan

[21] Appl. No.: 267,491

[22] Filed: Nov. 3, 1988

[30] Foreign Application Priority Data

Nov. 6, 1987 [JP] Japan .................... 62-280614
Nov. 6, 1987 [JP] Japan .................... 62-280615

[51] Int. Cl.⁵ .................... H04J 3/17; H04J 3/26
[52] U.S. Cl. .................... 370/94.1; 370/85.7
[58] Field of Search ............... 370/94, 89, 85; 340/825.5, 825.51; 371/33

[56] References Cited

U.S. PATENT DOCUMENTS

| | | | |
|---|---|---|---|
| 4,519,068 | 5/1985 | Krebs et al. | 370/94 |
| 4,611,323 | 9/1986 | Hessenmuller | 370/94 |
| 4,689,785 | 8/1987 | Toyonaga et al. | 370/94 |
| 4,719,621 | 1/1988 | May | 370/94 |
| 4,730,308 | 3/1988 | Friedman et al. | 370/94 |
| 4,740,958 | 4/1988 | Duxbury et al. | 370/94 |
| 4,774,706 | 9/1988 | Adams | 370/94 |
| 4,827,473 | 5/1989 | Tsuzuki et al. | 370/94 |

OTHER PUBLICATIONS

Edited by Investigation and Research Group on Development of Home Information System: "Introduction to Home Bus", pp. 15 to 23.

Primary Examiner—Douglas W. Olms
Assistant Examiner—Min Jung
Attorney, Agent, or Firm—Staas & Halsey

[57] ABSTRACT

A protocol control circuit for a data bus system in which data is communicated through a data bus and an acknowledgement signal is transmitted from a receiving unit through the data bus to a transmitting unit when data from the transmitting unit is received by the receiving unit. The protocol control circuit provides a buffer register unit including: a transmitting buffer register for storing at least one unit for data to be transmitted; an acknowledgement buffer register for storing the acknowledgement signal; and a selector connected to the transmitting buffer register and the acknowledgement buffer register. The selector carries out switching between the transmission of the output signal of the transmitting buffer register and the transmission of the output signal of the acknowledgement buffer register in correspondence with detection of proper timing of delivery of the acknowledgment signal.

5 Claims, 30 Drawing Sheets

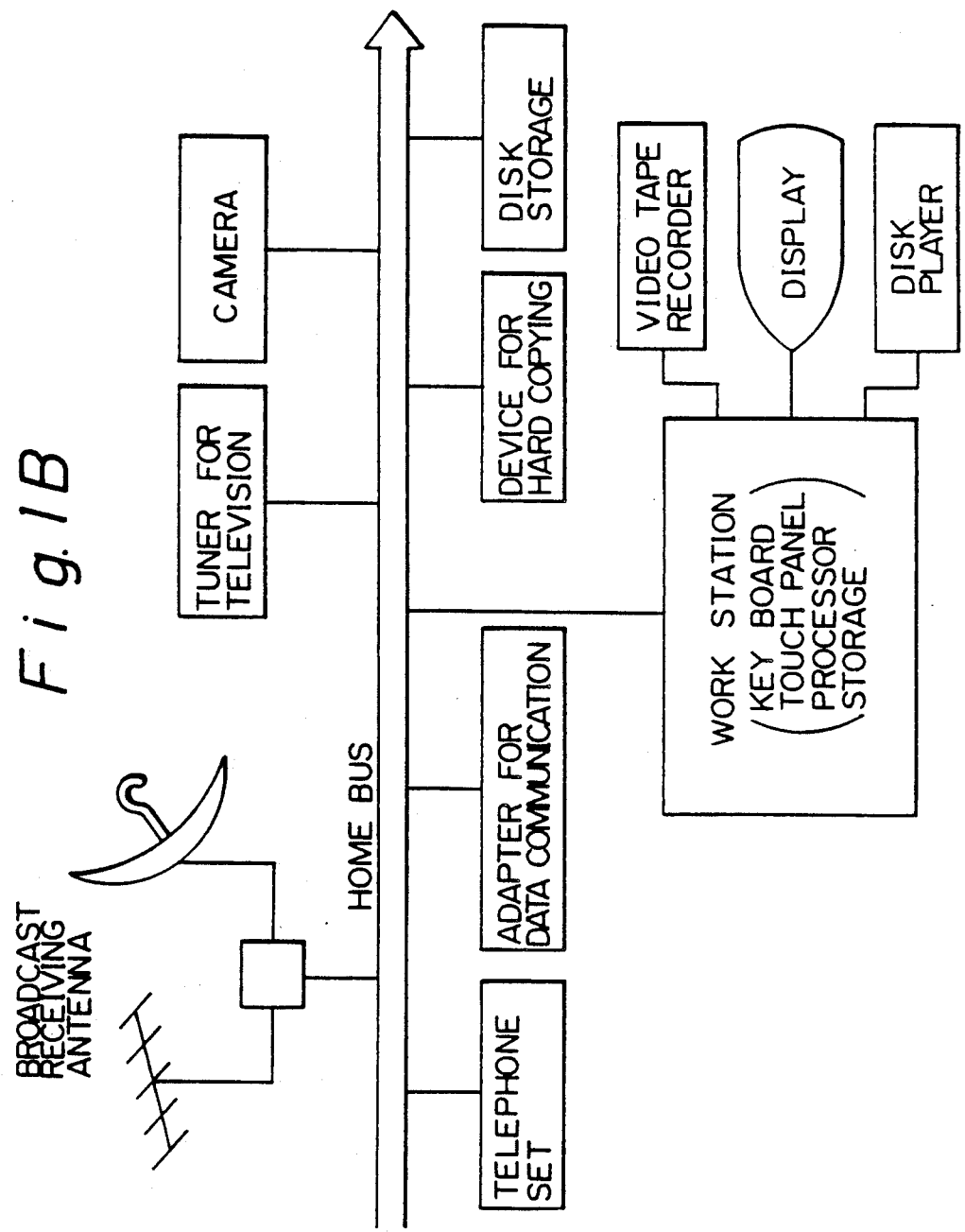

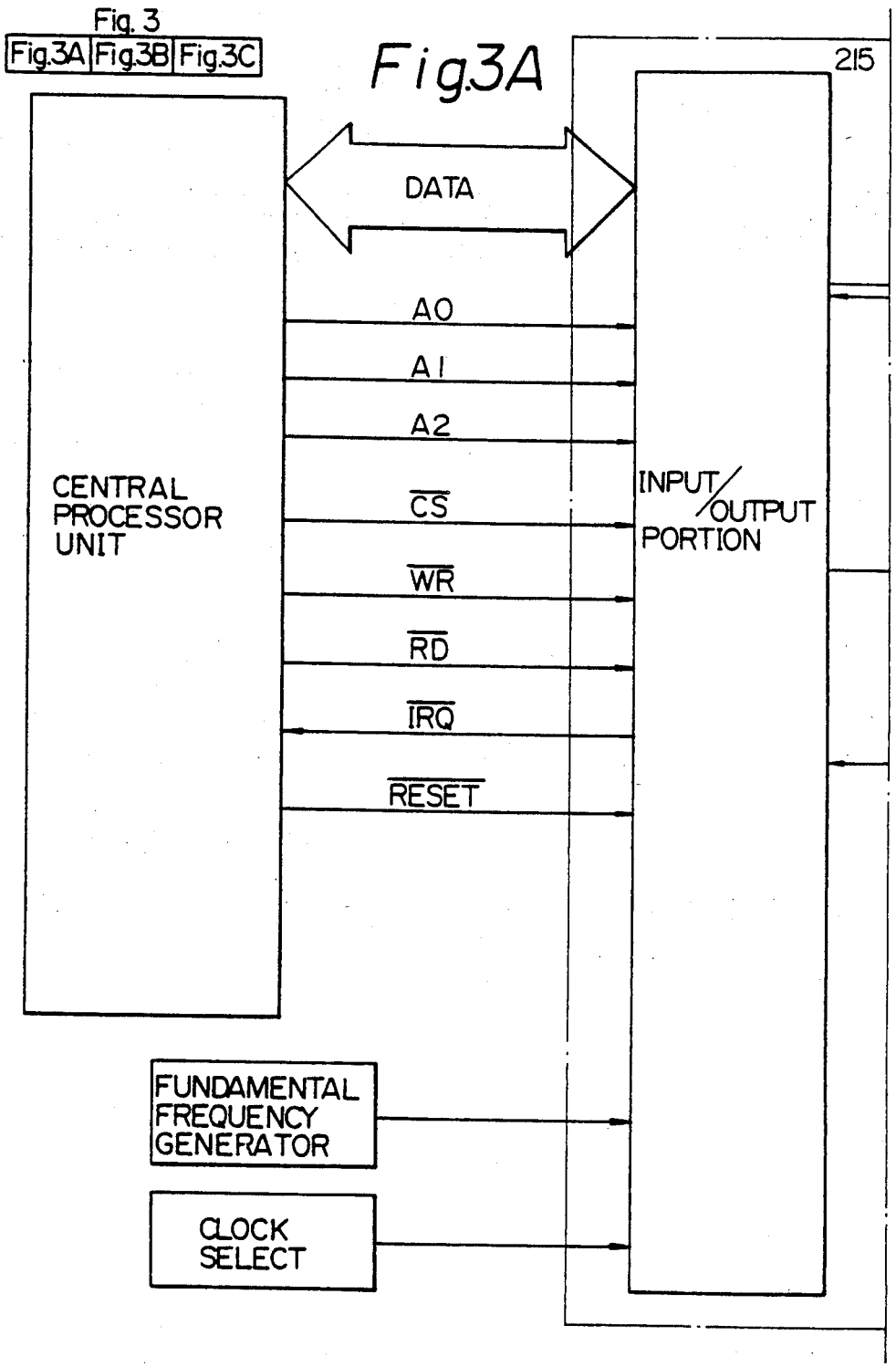

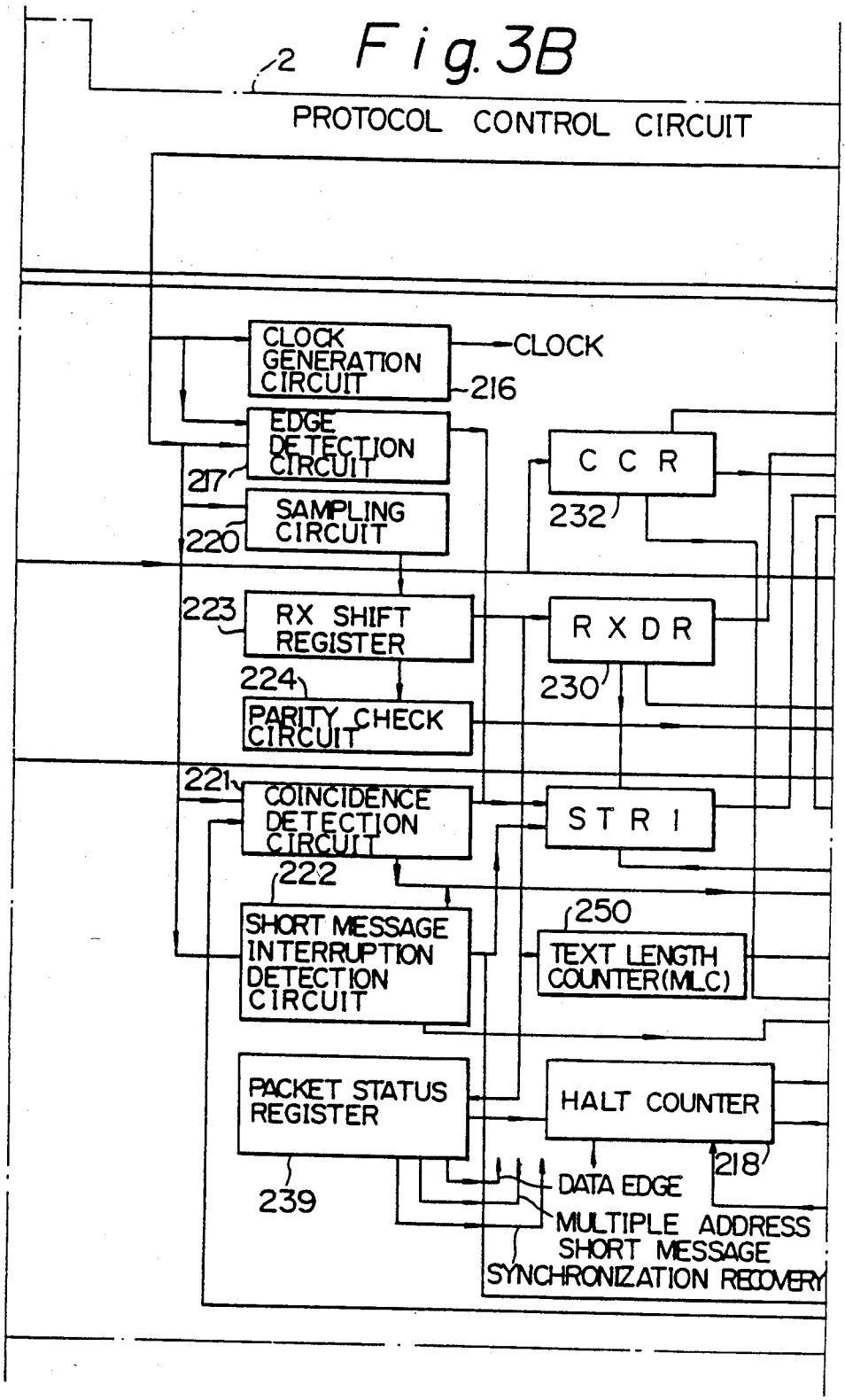

REGISTER TXDR/AKR

STRUCTURE OF DATA

DATA OF $\overline{TXH}$ AND $\overline{TXL}$

Fig. 8

BIT STRUCTURE OF REGISTER CCR IN MODE-1

| | 7 | 6 | 5 | 4 | 3 | 2 | 1 | 0 |
|---|---|---|---|---|---|---|---|---|
| CCR | 0 | 0 | 0 | 0 | SMI | RES | RIM | TIM |

Fig. 9

BIT STRUCTURE OF REGISTER CCR IN MODE-2

| | 7 | 6 | 5 | 4 | 3 | 2 | 1 | 0 |
|---|---|---|---|---|---|---|---|---|
| CCR | 0 | 1 | 1 | 0 | — | — | WBRC | LMES |

Fig. 10

BIT STRUCTURE OF STATUS REGISTER STR 1

| | 7 | 6 | 5 | 4 | 3 | 2 | 1 | 0 |
|---|---|---|---|---|---|---|---|---|
| STR1 | INTR | RSMI | CD | TX | ERR | BRC | RXRDY | TXRDY |

Fig. 11

BIT STRUCTURE OF STATUS REGISTER STR 2

| | 7 | 6 | 5 | 4 | 3 | 2 | 1 | 0 |
|---|---|---|---|---|---|---|---|---|
| STR2 | RDE | WLD | RLD | FE | PE | AKE | 0 | DRE |

Fig. 12

OPERATION OF STATUS COUNTER IN INDIVIDUAL MODE

| BUS DATA | PRIORITY CODE | SELF ADDRESS | DESTINATION ADDRESS | CONTROL CODE | MESSAGE LENGTH CODE | DATA | CHECK CODE | ACK/NAK |
|---|---|---|---|---|---|---|---|---|
| MDR | 0 | 1 | 2 | 3 | 4 | 5 | 6 | 7 | 8 | 9 | 10 | 11 | 0 | 1 |

Fig. 13

OPERATION OF STATUS COUNTER IN MULTIPLE ADDRESS MODE

| BUS DATA | PRIORITY CODE | SELF ADDRESS | DESTINATION ADDRESS | CONTROL CODE | MESSAGE LENGTH CODE | DATA | CHECK CODE |
|---|---|---|---|---|---|---|---|
| MDR | 0 | 1 | 2 | 3 | 4 | 5 | 6 | 7 | 8 | 9 | 0 | 1 |

Fig. 14

OPERATION OF STATUS COUNTER IN SYNCHRONIZATION RECOVERY PERIOD

| BUS DATA | PRIORITY CODE | SELF ADDRESS | DESTINATION ADDRESS | CONTROL CODE | MESSAGE LENGTH CODE | DATA | CHECK CODE | ACK/NAK |
|---|---|---|---|---|---|---|---|---|
| MDR | 0 | 2 | 3 | 4 | 5 | 6 | 7 | 8 | 9 | 10 | 11 | 0 | 1 |

Fig. 15

OPERATION OF STATUS COUNTER IN ACK/NAK ERROR MODE

| BUS DATA | PRIORITY CODE | SELF ADDRESS | DESTINATION ADDRESS | CONTROL CODE | MESSAGE LENGTH CODE | DATA | CHECK CODE | ACK/NAK |
|---|---|---|---|---|---|---|---|---|
| MDR | 0 | 1 | 2 | 3 | 4 | 5 | 6 | 7 | 8 | 9 | 10 | 0 | 1 |

Fig.16

| COUNT OF STATUS COUNTER | STATE |
|---|---|
| 0 | 22BIT BUS-AVAILABLE DETECTION PERIOD(22BIT OR 44BIT) |
| 1 | HALT PERIOD (10ms − 22BIT − 208 μs) |
| 2 | COINCIDENCE MONITOR PERIOD(208μs)+DATA INPUT WATING |
| 3 | PRIORITY CODE PERIOD |
| 4 | SELF ADDRESS PERIOD |
| 5 | DESTINATION ADDRESS PERIOD |
| 6 | CONTROL CODE PERIOD |
| 7 | MESSAGE LENGTH PERIOD |
| 8 | DATA PERIOD |
| 9 | CHECK CODE PERIOD |
| 10 | DUMMY CODE PERIOD |
| 11 | ACK/NAK PERIOD |

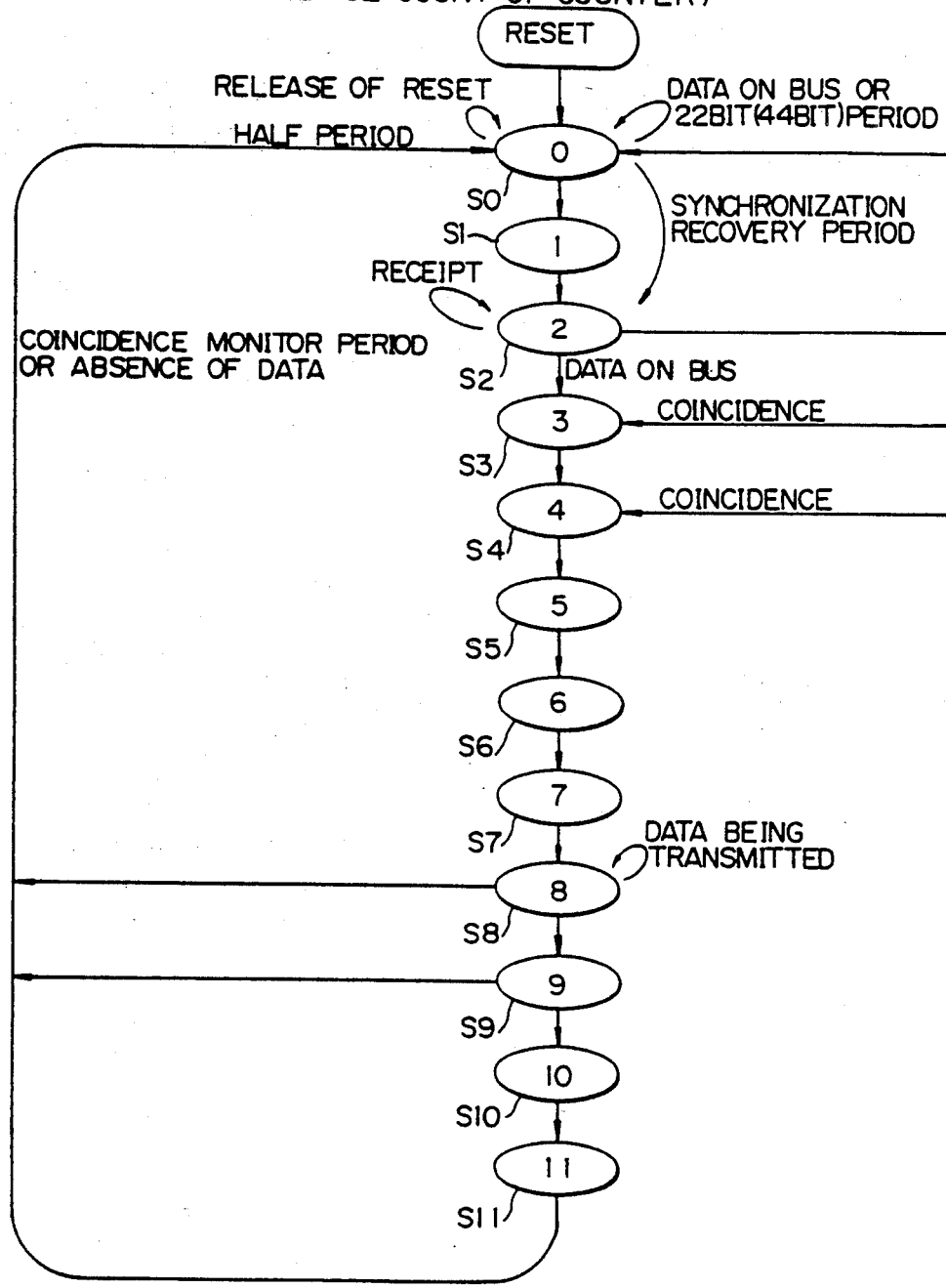

ILLUSTRATION OF COINCIDENCE

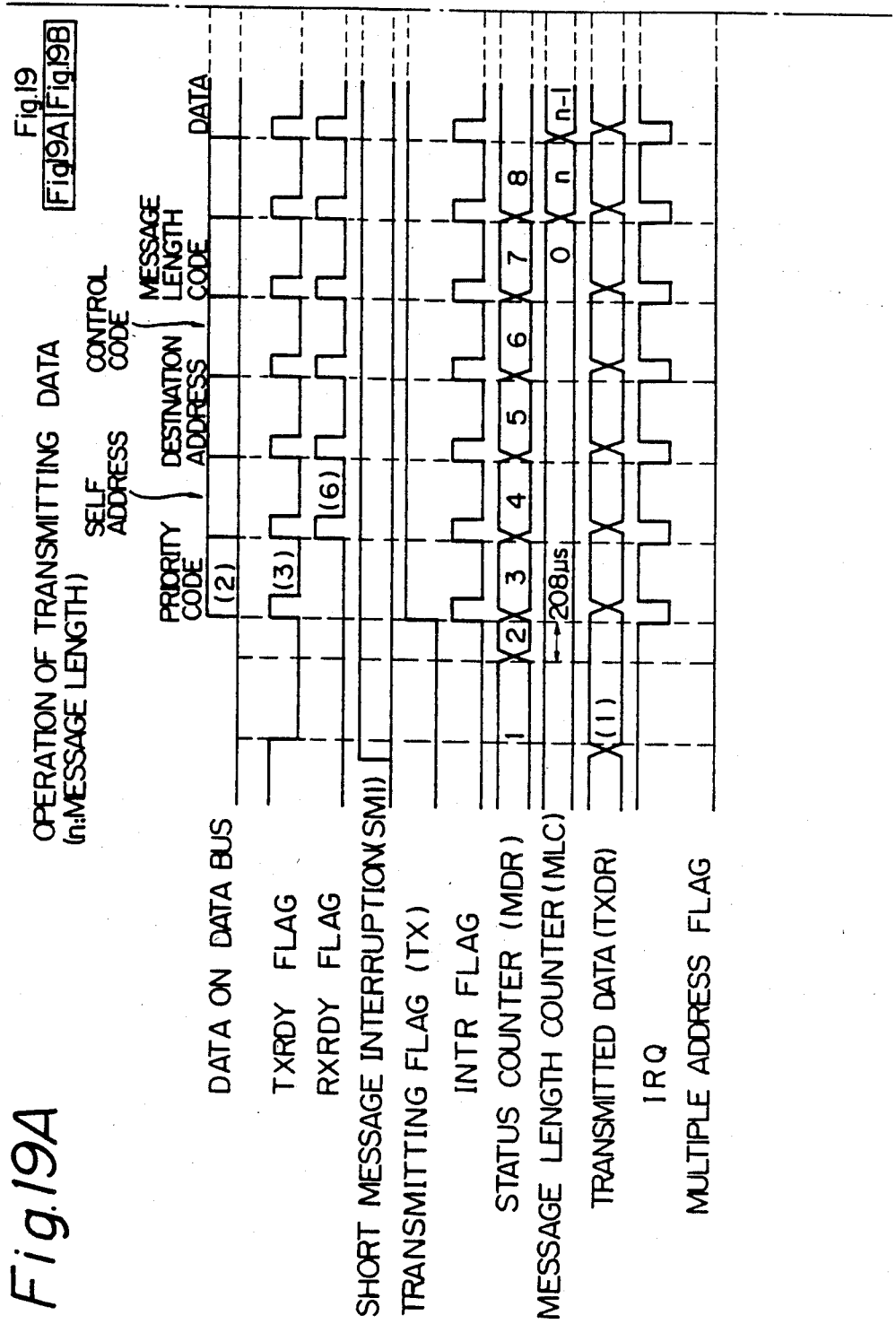

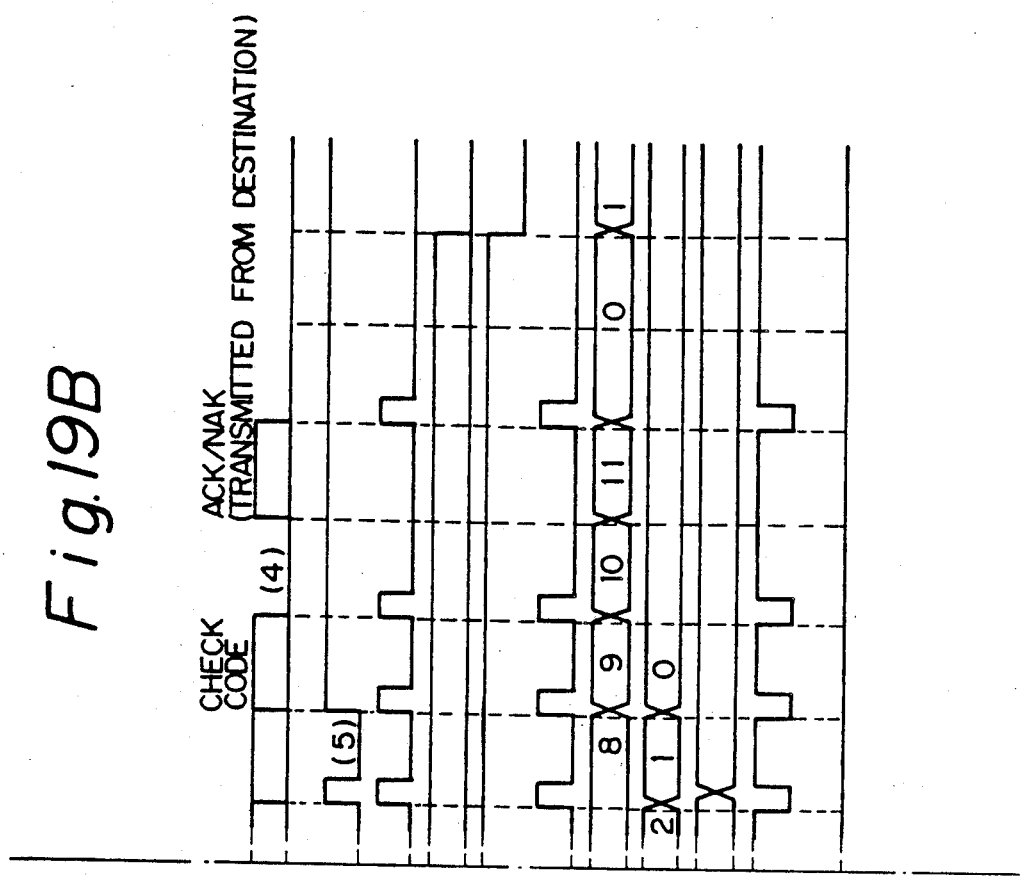

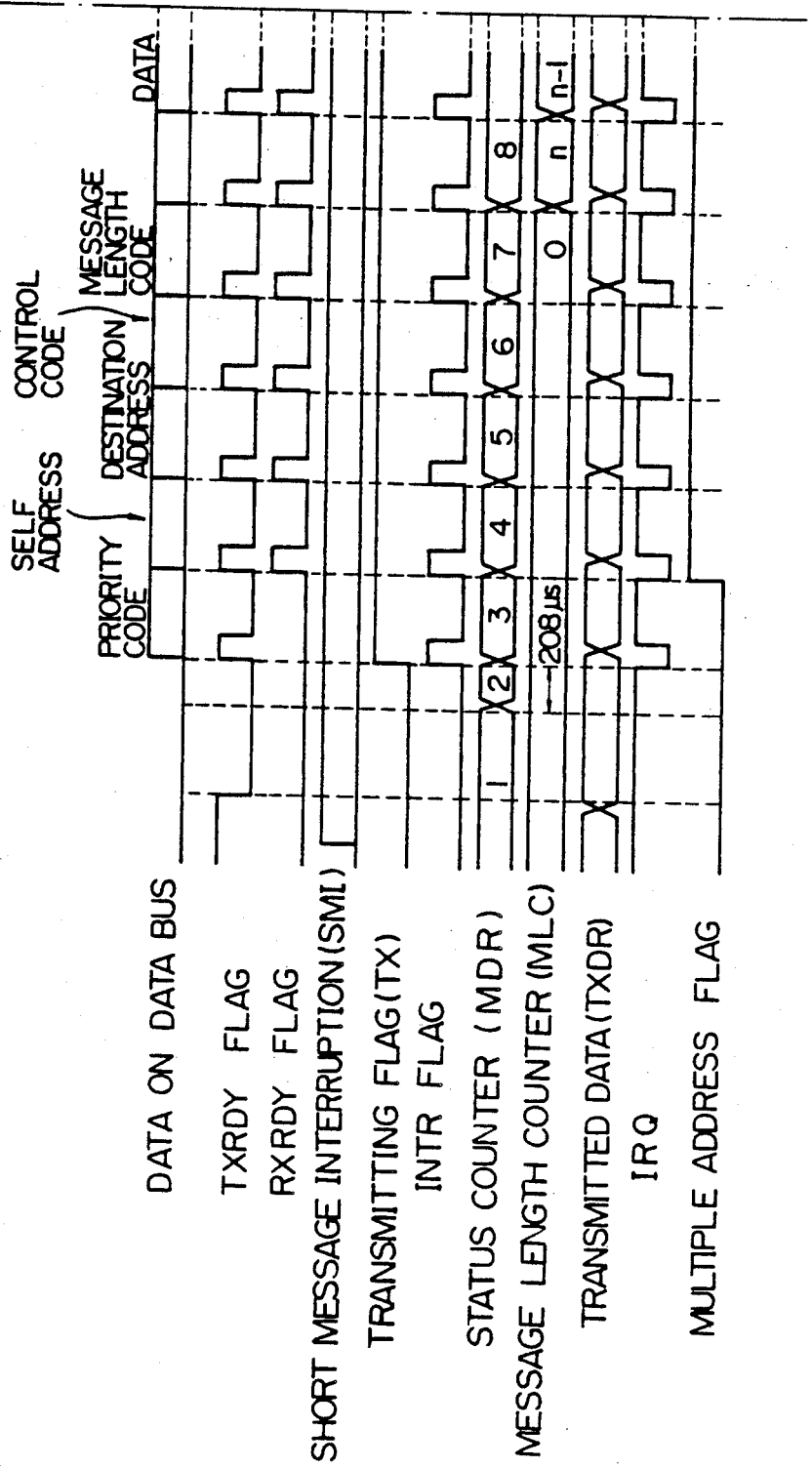

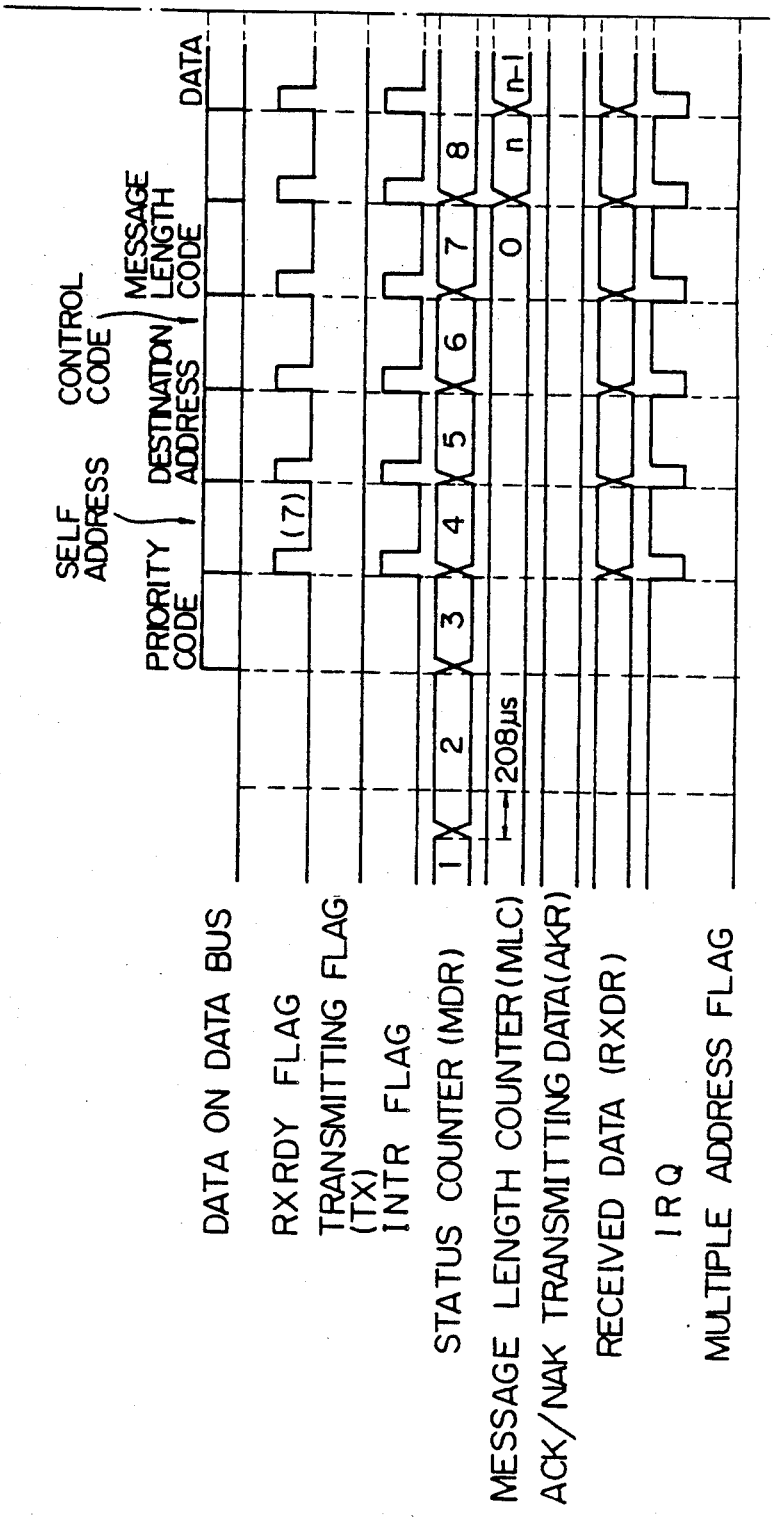

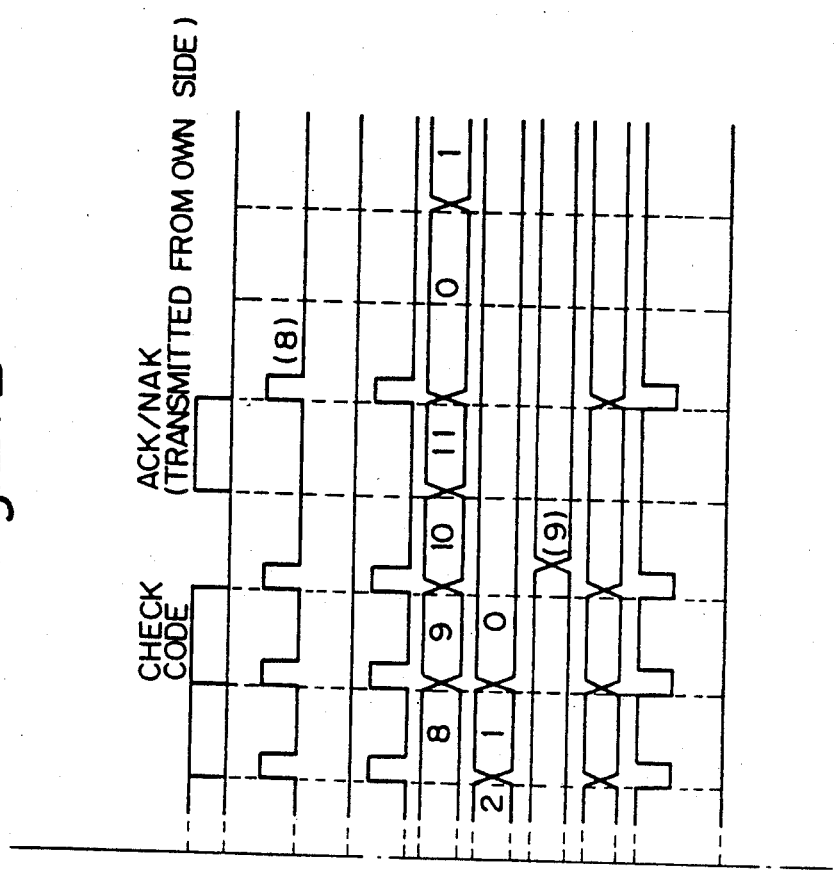

Fig.22

LONG MESSAGE OR MULTIPLE ADDRESS
IN CORRESPONDENCE WITH PRIORITY CODE

| PRIORITY CODE | | |
|---|---|---|
| BIT 0 | BIT 1 | |
| 0 | 0 | — |
| 0 | 1 | — |
| 1 | 0 | — |
| 1 | 1 | LONG MESSAGE |

| PRIORITY CODE | |
|---|---|
| BIT 6 | |
| 0 | — |
| 1 | MULTIPLE ADDRESS |

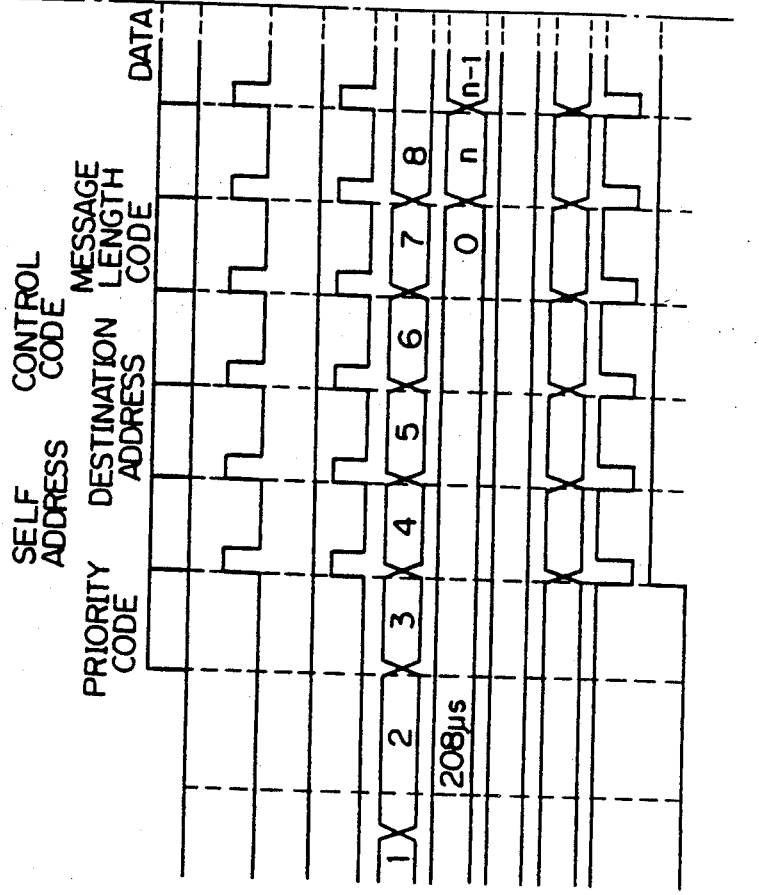

Fig.27

RANGE OF DETECTION OF START BIT POSITION
(MESSAGE LENGTH: 1)

| RANGE OF DETECTION | | X1 | X2 | X3 | X4 | X5 | X6 | X7 | | X8 | X9 | |
|---|---|---|---|---|---|---|---|---|---|---|---|---|
| MDR | 1 | 2 | 3 | 4 | 5 | 6 | 7 | 8 | 9 | 10 | 11 | 0 |
| MLC | 0 | | | | | | | | 1 | | | 0 |

Fig.28

OPERATION OF MESSAGE LENGTH COUNTER

| BUS DATA | MESSAGE LENGTH n | DATA | | | | | CHECK CODE |
|---|---|---|---|---|---|---|---|
| MLC | 0 | n | n-1 | n-2 --- 3 | 2 | 1 | 0 |

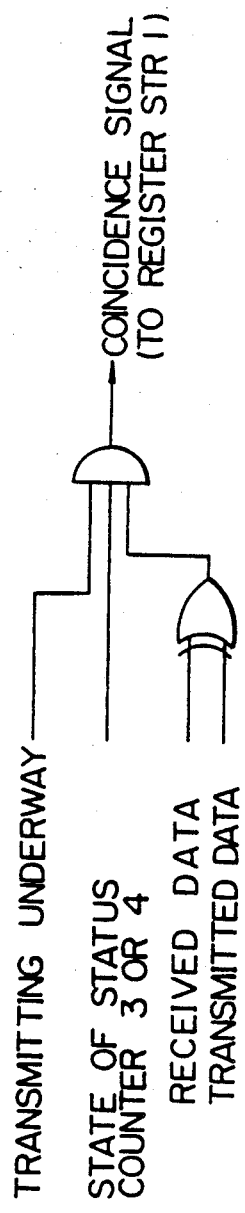
Fig.29 LOGIC CIRCUIT FOR COINCIDENCE DETECTION
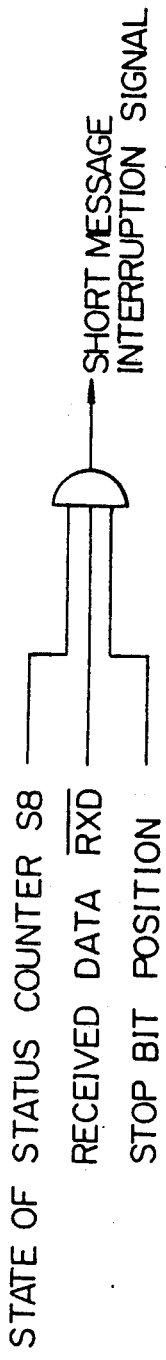
Fig.30 LOGIC CIRCUIT FOR SHORT MESSAGE INTERRUPTION

PROTOCOL CONTROL CIRCUIT FOR DATA BUS SYSTEM

BACKGROUND OF THE INVENTION

1. Field of the Invention

The present invention relates to a protocol control circuit for a data bus system. The protocol control circuit according to the present invention is applicable to a home bus system as one kind of data bus system.

2. Description of the Related Arts

Recently, a data communication system in a home has been developed in which data for the control of household electrical apparatuses in the home is communicated through a trunk data bus called a "home bus". Examples of known data communication systems using a home bus are illustrated in FIGS. 1A and 1B attached to this specification. As shown in FIG. 1A, a house is equipped with electrical units such as a broadcast receiving antenna, a security switch device, a smoke detector, a personal computer, an interphone, an air conditioner, a telephone set, a television receiver, an electric heated bath, a gas leakage detector, an electric cooking range, an electric lamp, a camera, an electric key device, a home controller, and the like, and each of these electrical units are interconnected by a home bus through a junction box for information transmission. A schematic diagram of the arrangement of the home bus system is shown in FIG. 2, in which a broadcast receiving antenna device, a tuner for television, a camera, a telephone set, an adapter for data communication, a device for hard copying information, a disk storage, and a work station are connected by a home bus. The work station includes a keyboard, a touch panel, a processor, a storage unit, and the like, and is connected to a video tape recorder, a display device, and a disk player.

In a data bus system such as a home bus system, however, a problem occurs in that, when it is desired to carry out transmission of data from this equipment connected to a data bus such as a home bus, if this equipment is receiving incoming data from the data bus, the desired transmission of data cannot be carried out until the equipment receives acknowledgement data from the data bus after receipt of the incoming data is completed.

This problem prevents an increase in the efficiency of transmission of acknowledgement data, and increases the burden on software of a central processor unit, and thus a data bus system having a satisfactory high operation efficiency has not yet been realized.

SUMMARY OF THE INVENTION

An object of the present invention is to provide an improved protocol control circuit for a data bus system in which the efficiency of transmission of acknowledgement data is increased, the burden on software of a central processor unit is reduced, and the operation efficiency of the data bus system is increased.

In accordance with the present invention, there is provided a protocol control circuit for a data bus system in which data is communicated through a bus and an acknowledgement signal is transmitted from a receiving unit through the data bus to a transmitting unit when data from the transmitting unit is received by the receiving unit. The protocol control circuit includes a buffer register unit including: a transmitting buffer register for storing at least one unit of data to be transmitted; an acknowledgement buffer register for storing the acknowledgement signal; and a selector connected to the transmitting buffer register and the acknowledgement buffer register for switching between the transmission of the output signal of the transmitting buffer register and the transmission of the output signal of the acknowledgement buffer register, in correspondence with a timing signal for delivery of the acknowledgment signal.

BRIEF DESCRIPTION OF THE DRAWINGS

In the drawings:

FIGS. 1A and 1B show a home bus system as one kind of data bus system to which the present invention can be applied;

FIGS. 8 and 9 show bit sequences of the control code register (232);

FIG. 10 shows a bit sequence of a status register (231);

FIG. 11 shows a bit sequence of another status register (229);

FIGS. 12 to 15 show bit sequences of the status counter register (219);

FIG. 16 shows the state of the status counter register (219) in correspondence with the count;

FIG. 19 shows the waveforms for illustrating the data transmitting operation;

FIG. 21 shows the waveforms for illustrating the data receiving operation;

FIG. 22 shows the determination of the long message, the short message, and the multiple address mode in correspondence with the bits of the priority code;

FIG. 27 illustrates the operation of detection of the timing of the start bit;

FIG. 28 illustrates the operation of the message length counter;

FIG. 29 shows the logic circuit for the coincidence detection; and

FIG. 30 shows the logic circuit for the signal for indicating an occurrence of the short message interruption.

DESCRIPTION OF THE PREFERRED EMBODIMENTS

Figure 1A:
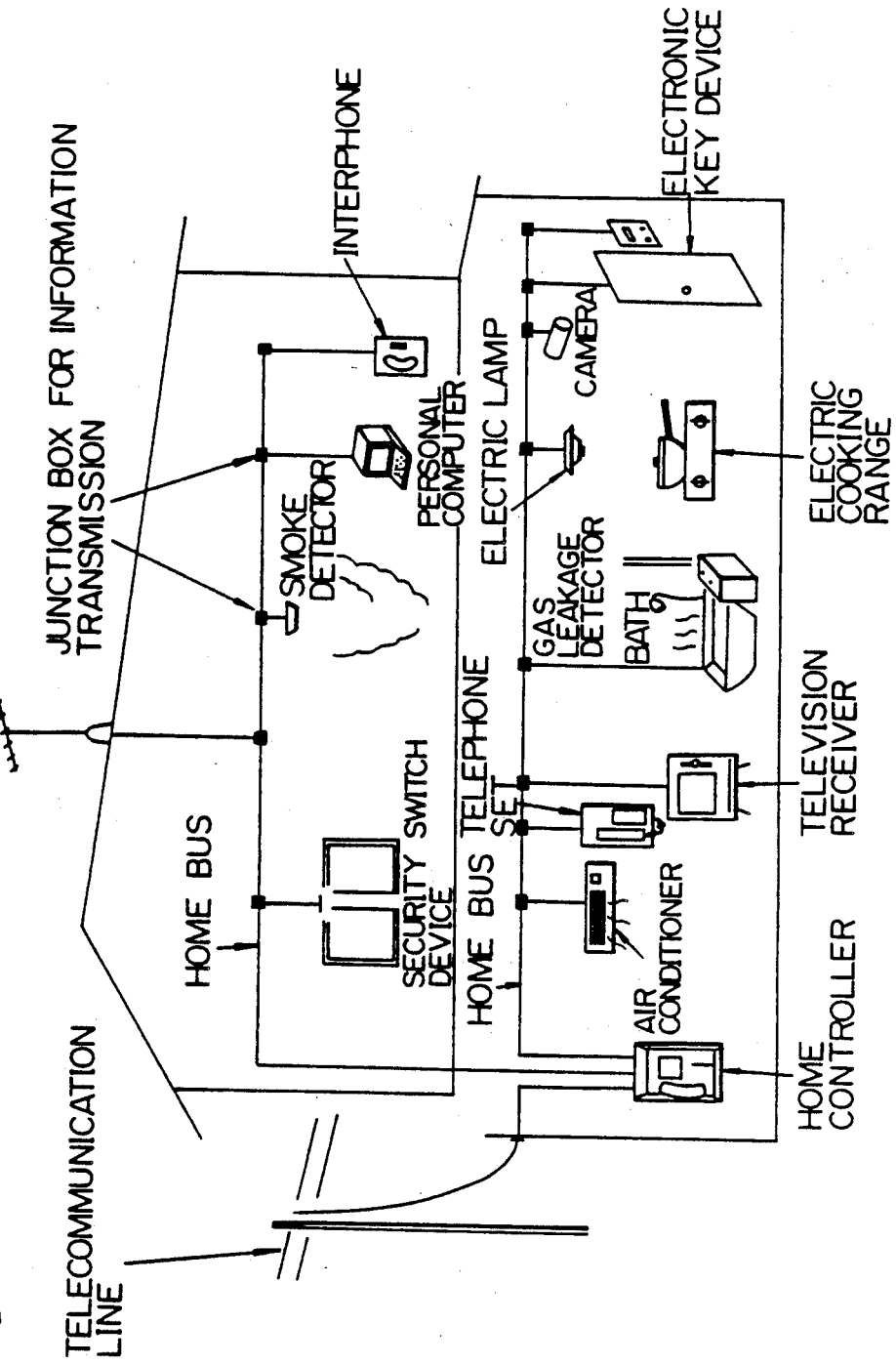
Figure 2:
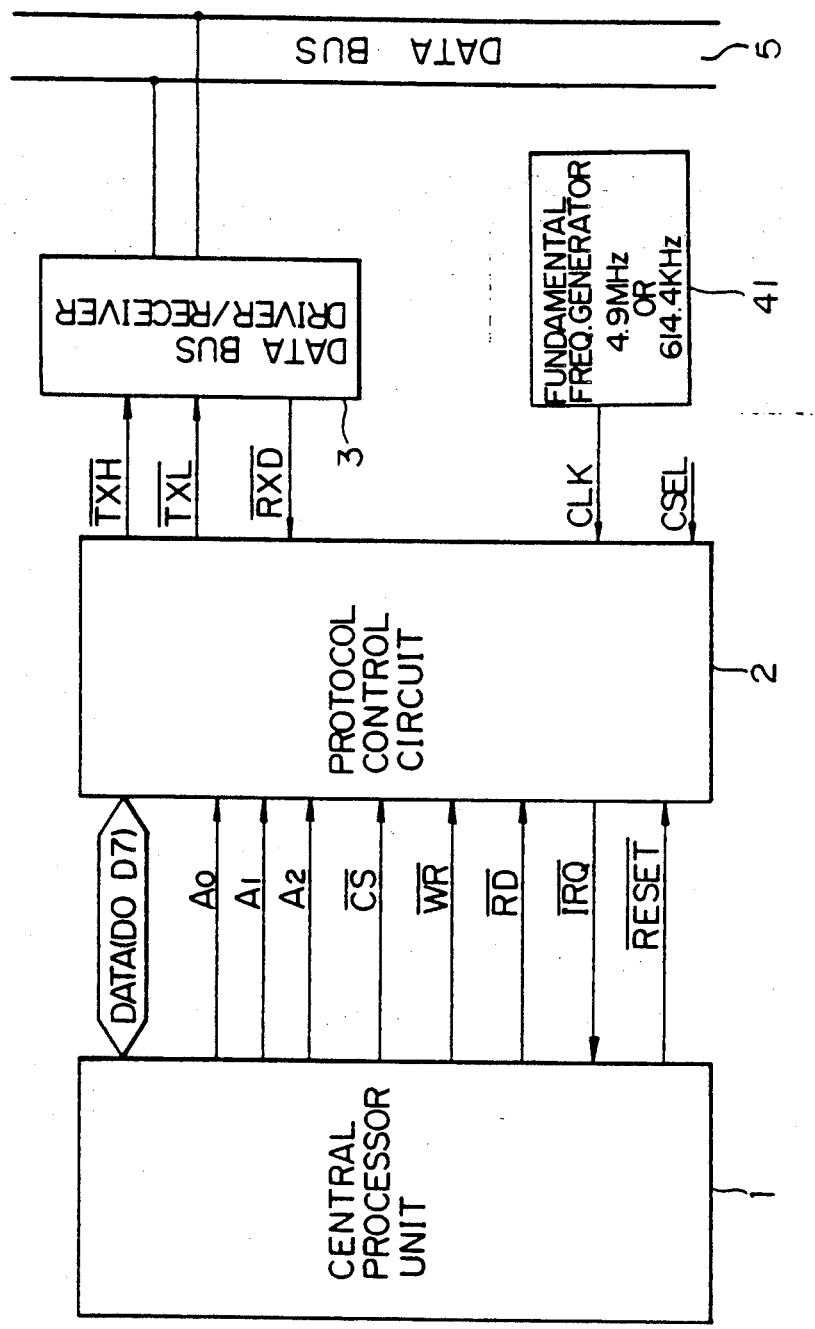
FIG. 2 is a schematic diagram of a data bus system in which a protocol control circuit according to the present invention is included.

An example of a data bus system using a protocol control circuit of the present invention is shown in FIG. 2. In the system of FIG. 2, a central processor unit 1 and a protocol control circuit 2 are connected by a data bus (DATA (D0–D7)), an address bus ($A_0$–$A_2$), a chip select ($\overline{CS}$) line, a write signal ($\overline{WR}$) line, a read signal ($\overline{RD}$) line, a reset signal ($\overline{RESET}$) line, and an interruption signal ($\overline{IRQ}$) line. The terminals of the protocol control circuit 2 are connected to these signal lines, for the following purposes, respectively. The protocol control circuit 2 in an embodiment of the present invention includes eight registers. The terminal connected to the address bus $A_0$ to $A_2$ selects an internal register, in which one of the registers TXDR, RXDR, AKR, CCR, STR1, STR2, MDR, and MLC is selected based on the address signal $A_0$ to $A_2$. The chip select signal terminal is operatively connected to the protocol control circuit by the central processor unit 1. This terminal is connected when a LOW signal is supplied, to enable a write to and/or read from each register of the protocol control circuit 2. The write signal terminal is supplied with a LOW signal when data is written to each register, and the read signal terminal is supplied with a LOW signal when data is read from each register. When a LOW signal is supplied to the write signal terminal, the register indicated by an address value delivered from the address signal terminal, i.e., a register indication value, stores data supplied from the data bus, and when a LOW signal is supplied to the read signal terminal, the data of the register indicated by a register indication value supplied from the address signal terminal is delivered to the data bus.

The reset terminal is used for resetting the protocol control circuit 2, and when a LOW signal is supplied to this terminal the protocol control circuit 2 initializes the value of each register.

The interruption signal terminal is used by the protocol control circuit 2 to deliver data. For example, a LOW signal is output from this terminal upon receipt of one byte of data.

Although not shown in FIG. 2, the central processor unit 1 includes a ROM and/or RAM, and when executing programs stored in the ROM, transmits control data, etc, to and receives control data, etc., from the control channel of the data bus, as described later. Further, in addition to the address bus $A_0$–$A_2$, the central processor unit 1 receives the upper bits of the address bus $A_{15}$–$A_3$, and the ROM and/or RAM connected with these address bus signals $A_{15}$–$A_3$ operates as a processor circuit.

The control circuit 2 includes terminals other than those previously described, for example, terminals connected to the bus driver/receiver 3 (data ($\overline{RXD}$) input terminal, data output terminal in the positive (+) direction, and data output terminal in the negative (−) direction of the data bits), and further, includes a clock input terminal to which the clock signal CLK is applied from the fundamental frequency generator 41. The fundamental frequency generator 41 outputs clock signals of 4.9M Hz and 614.4K Hz, and the protocol control circuit 1 also provides the clock select terminal to which the clock select signal (CSEL) is applied, to indicate the frequency when one of the two frequencies is applied thereto.

Figure 3C:
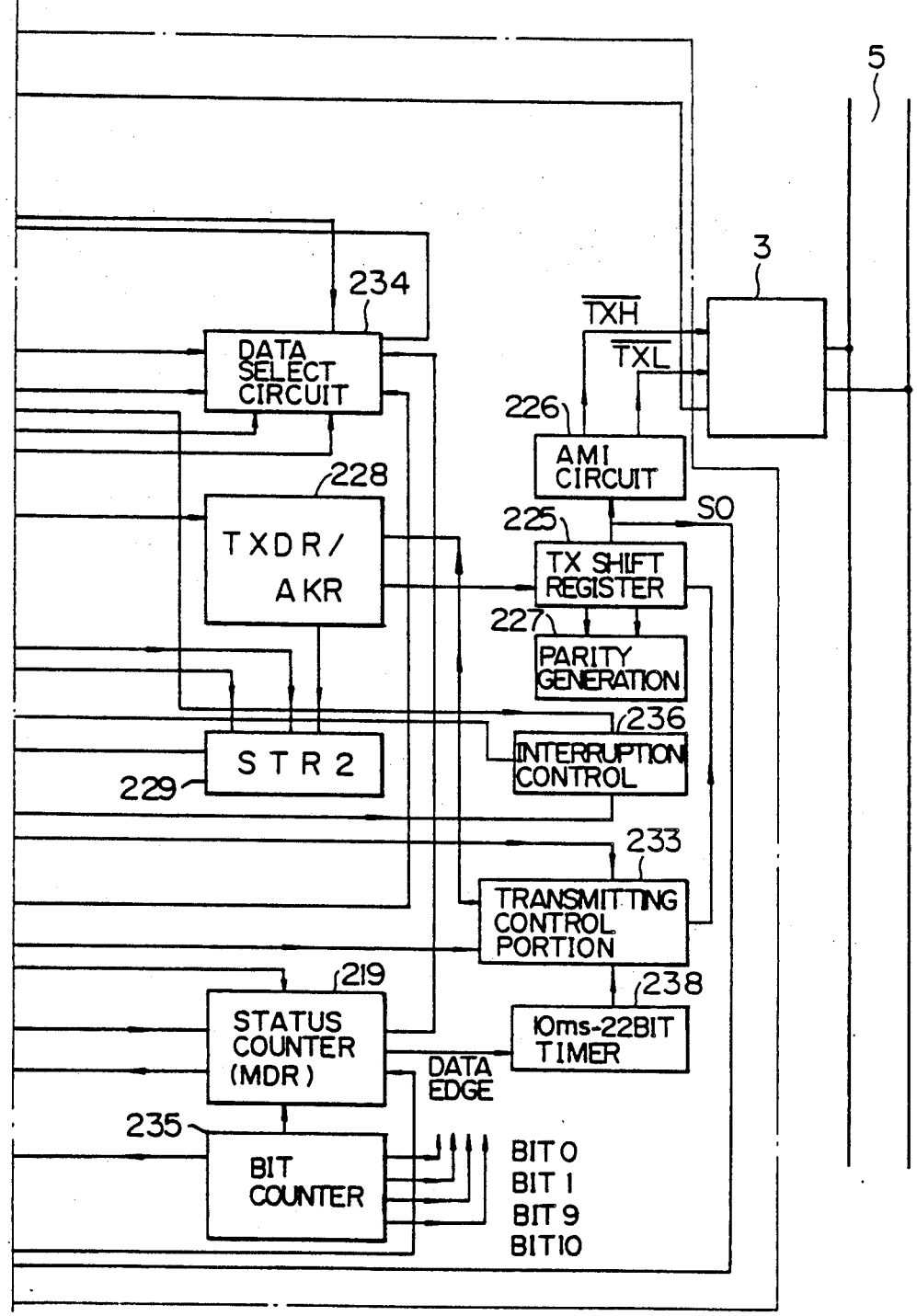
FIG. 3 shows the structure of the protocol control circuit as an embodiment of the present invention.
Figure 4:
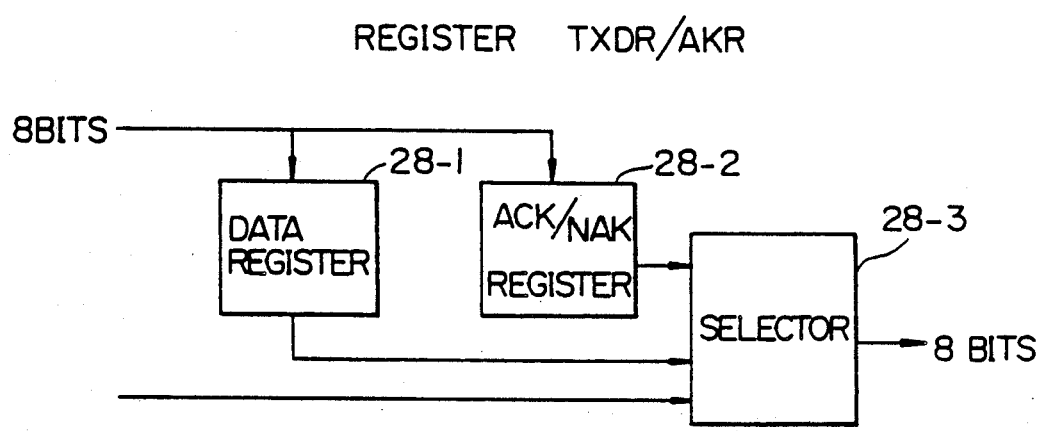
FIG. 4 shows the structure of the buffer register unit including the transmitting buffer register, the acknowledgement buffer register, and the selector used for the circuit of FIG. 3.
Figure 5:
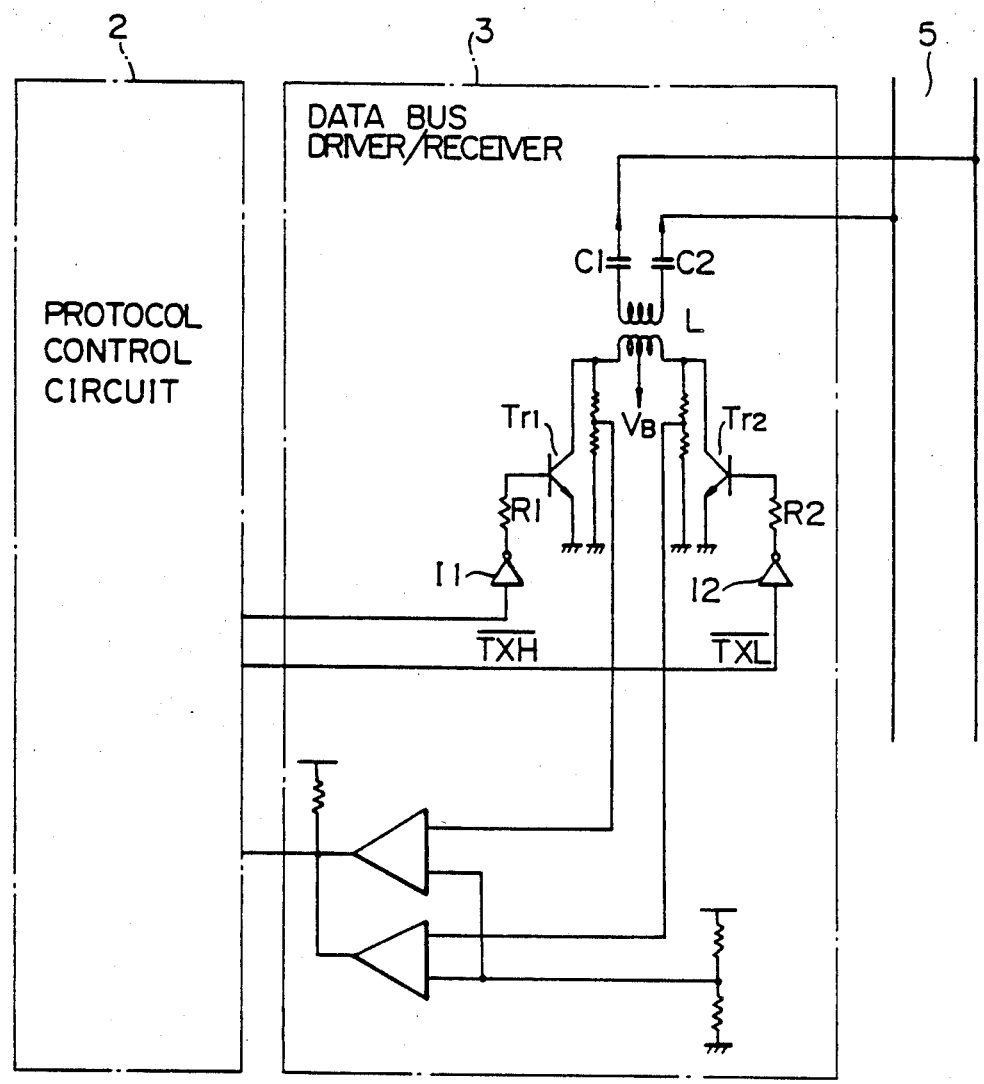
FIG. 5 shows the structure of the data bus driver/receiver used for the circuit of FIG. 3.

FIG. 3 shows a protocol control circuit as an embodiment of the present invention. An important arrangement of the buffer registers in the circuit of FIG. 3 is shown in FIG. 4, and FIG. 5 shows a configuration of the bus driver/receiver unit in the system shown in FIG. 2. The data (DATA), address signal $A_0$–$A_2$, write signal $\overline{WR}$, read signal $\overline{RD}$, chip select signal $\overline{CS}$, reset signal $\overline{RESET}$, clock signal CLK, interruption signal $\overline{IRQ}$, and clock select signal CSEL are applied to the input/output circuit 215, which outputs these signals to each circuit at the respective destinations thereof.

The clock signal CLK is applied as a master clock to both a clock generation circuit 216 and an edge detection circuit 217. The clock generation circuit 216 generates clocks of each circuit, as explained in detail later, and applies these clocks to each circuit respectively.

The edge detection circuit 217, upon input of the received data, i.e., the data of the data bus ($\overline{RXD}$), informs the halt counter 218 and the status counter (MDR) 219, explained in detail below, that it has detected the data edge, i.e., has started to receive data, when detecting the edge of data from the master clock.

Data of the data bus ($\overline{RXD}$) is also applied to the sampling circuit 220, the coincidence detection circuit 221, and the short text interruption detection circuit 222, other than the edge detection circuit 217. The data of the data bus is, for example, serial data of 9600 bps, and the sampling circuit 220 reads sequential serial data in units of one bit and applies the data to the RX shift register 223.

Figure 6:
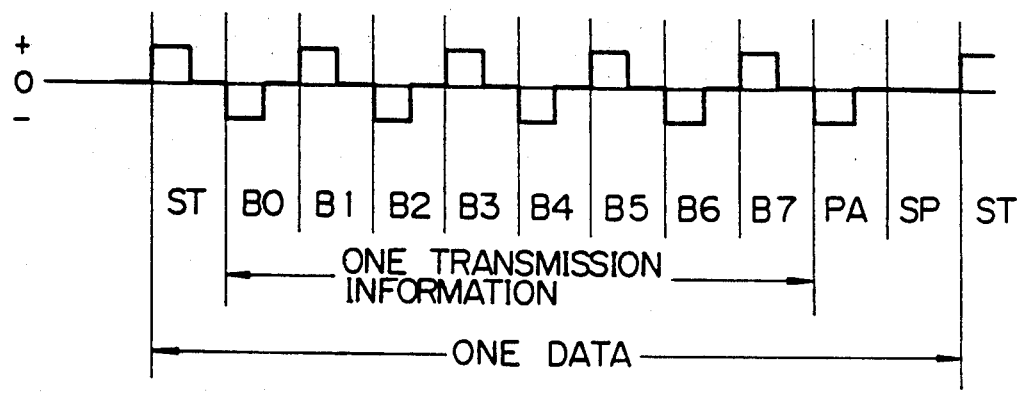
FIG. 6 shows the waveform of one data.

The data bus shown in FIG. 2 is, for example, a 2-strand twisted line. The data bus driver/receiver 3 delivers signals to this data bus, or receives signals from other devices. This signal to be delivered to the data bus consists of 11 bits per 1 data. FIG. 6 is a data configuration diagram consisting of a start bit ST 8 bits of transfer information, i.e., transmitted data $B_0$–$B_7$, one parity bit (PA), and further, one stop bit (SP). In the data bus, when LOW "0" is indicated, a pulse in the plus or the minus direction exists, but when HIGH "1" is indicated, this pulse does not exist. Note, the start bit is always LOW "0", and the stop bit is always HIGH "1". The data $B_0$–$B_7$ of FIG. 6 is converted into a signal of 0's and 1's by the data bus driver/receiver 3, and is output to the protocol control circuit 2 as the received data $\overline{RXD}$. The sampling circuit 220 samples sequential 0 and 1 signals. The RX shift register 223 receives each bit $B_0$–$B_7$ of transmitted information output in 1 bit units from the sampling circuit 220 and shifts these bits. Each time the RX shift register 223 shifts the data, the RX shift register 223 feeds the same data to the parity check circuit 224, which counts the number of bits of 0 or 1 in the transmitted information and compares these bits with the parity applied after the transmitted information. This parity is a conventional even parity or odd parity, and the parity check circuit 224 determines whether the data is normal upon receipt of transmitted information. If the data is not normal, for example, when the number of 0 bits is not even, a data abnormality state is stored in the status register (STR2) 229.

The RX shift register 223 is used for a serial-in and-parallel-out operation. Namely, when the register 223 receives transmitted information, 8 bits of the information are stored to the received data register (RXDR) 230. As described later, when transmitted information is stored in the received data register (RXDR) 230, a flag ON signal enabling the processor 1 to read the data is supplied to the status register (STR1). In this storage, when the processor, for example, reads the status register (STR1) 231 and finds the receiving flag is ON, it determines that 1 byte of information has been transmitted to the received data register.

The data from the data bus can be received by each of circuits described above.

The register (TXDR/AKR) 228 is a transmission buffer for delivering transmitted information and the like to other devices, through the data bus. When the central processor unit 1 selects this register (TXDR/AKR) 228 and stores the transmitted information and the like, the TX shift register 225 reads the data, adds a start bit, and delivers the data to the AMI circuit 226 and coincidence detection circuit 221 as the sequence 1 bit serial data SO. Further, the parity generation circuit 227 is supplied with 8 bits of data to be transmitted through the TX shift register 225, generates a parity bit in correspondence with the data to be transmitted, and supplies the parity bit to the TX shift register 225. This parity bit is inserted in the parity bit position as shown in the data configuration diagram of FIG. 6, successively from the transmitted information $B_0$–$B_7$, and the parity bit PA is then output from the TX shift register 225. Following this parity bit PA, the stop bit SP is inserted by the TX shift register 225, and thus the data delivery is completed.

Figure 7:
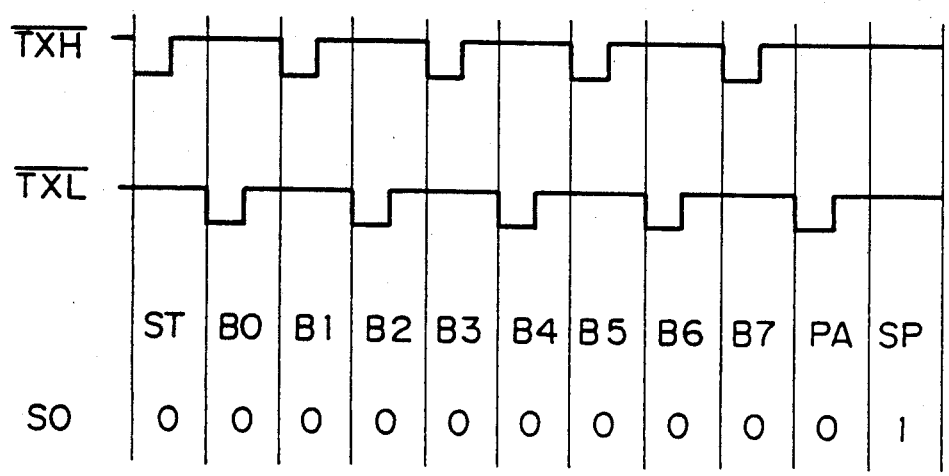
FIG. 7 shows the waveforms of transmitted data.

The control signal is output from the control code register (CCR) 232 to the transmission control portion 233. The transmission control portion 233 reads the data from the above-mentioned register (TXDR/AKR) 228 by this signal, outputs the data, to the TX shift register 225, and then supplies a sequential delivery control signal in units of 1 bit to the TX shift register 225. The above-mentioned serial data SO is then output from the TX shift register 225. In the data bus, to eliminate the direct current component of the electric current in the transmission of serial data, plus and minus pulses, as shown in FIG. 6, are repeatedly generated when the data is "0". The AMI circuit 226 controls these repeated pulses and generates a control signal for delivering the plus and minus pulses. When the serial data supplied to the AMI circuit 226 is "00000000001" as shown in FIG. 6, the transmitted data signals $\overline{TXH}$ and $\overline{TXL}$, as shown in FIG. 7, are "0" since $\overline{TXH}$ and $\overline{TXL}$ alternately generate the plus and minus pulses.

FIG. 5 is a circuit diagram of the data bus driver/receiver 3. Transmitted data $\overline{TXH}$ and $\overline{TXL}$ are respectively applied to the bases of the transistors $Tr_1$ and $Tr_2$ through the inverters 11 and 12, via the resistors $R_1$ and $R_2$. The emitters of the transistors $Tr_1$ and $Tr_2$ are grounded, and the collectors thereof are connected to both ends of the primary coil of the transformer L, in which an intermediate point of the primary coil is connected to the electric source $V_B$, and both ends of the secondary coil of the transformer L are connected to the data bus via capacitors $C_1$ and $C_2$. Since the transmitted data $\overline{TXH}$ is supplied to the inverter 11 as shown in FIG. 5, the transistor $Tr_1$ becomes ON at bits ST, $B_1$, $B_3$, $B_5$, and $B_7$. Further, since the transmitted data $\overline{TXL}$ is supplied to the inverter 12, the transistor $Tr_2$ becomes ON at bits $B_0$, $B_2$, $B_4$, $B_6$, and PA.

When the transistor $Tr_1$ is made ON, an electric current flows from the electric source L to the side to which the transistor $Tr_1$ is connected via an intermediate point of the primary coil of the transformer, thus delivering a plus pulse to the data bus, and when the transistor $Tr_2$ is made ON, a minus pulse is delivered to the data bus. Further, the capacitors $C_1$ and $C_2$ are set with a direct current system or a low frequency band. In some cases, the electric power is supplied through the data bus, and in such a case, the direct current component is eliminated by these capacitors.

When information is transmitted, the data bus supplies an acknowledge signal ACK or non-acknowledge signal NAK to determine whether or not the destination devices have received the data. The acknowledge signal ACK and non-acknowledge signal NAK are generally treated as data to be transmitted, i.e., general information, and therefore, in the prior art, only one register is provided for storing the data to be transmitted. In the present invention, however, two registers are provided for data use and for ACK use. FIG. 4 is a configuration diagram of the register (TXDR/AKR) 228.

The data register 228-1 and ACK/NAK register 228-2 divide and store 8-bits of data from the buffer circuit 215. As described later, the data of the data register (TXDR) 228-1 and ACK/NAK register 228-2 is separately stored via the buffer circuit 215. The transmission control portion 233 supplies signals from these registers and a selection signal for selecting the register (TXDR/AKR) 228, and this selection signal is delivered to the selector 228-3 shown in FIG. 4. The selector 228-3 selects one of the data of the data register 228-1 or the ACK/NAK register 228-2 upon receiving this selection signal, and the selected data is supplied to the TX shift register 225. As previously described, in the device of the prior art the data of only one register is supplied, but in the device of the present invention, as shown in FIG. 4, the data and the information to be transmitted are stored in two registers, and transmitted from the selected register when required. The selection of the registers is made in accordance with whether information or the ACK signal is to be transmitted, and accordingly, a write conversion is not required when writing to the register from the processor 1, and the program can be prepared without the need to detect the data or the ACK signal.

The circuit shown in FIG. 4 includes 8 registers which can be read from or written in via the buffer circuit 215. A write to the registers CCR and TXDR/AKR is carried out, and the data or the signal is written to a specific register as indicated by the buffer circuit 215, i.e., according to the write indication from the processor 1. A read is carried out from the registers RXDR, CCR, STR1, STR2, MDR, and MLC, and the data select circuit 234 selects the respective output according to the value of address signal $A_0$–$A_2$ and supplies the selected output to the data (DATA) bus of the central processor unit 1 through the buffer circuit 215.

The transmitted data register TXDR is an 8-bit register used exclusively for writing, and data other than ACK/NAK supplied to the bus is written to this register by the processor 1. Further, when the data is written to this register, a series of data transmitting operations is begun. The receiving data register RXDR is an 8-bit register used exclusively for reading data from the data bus. The register AKR, i.e., ACK/NAK transmitting register, is an 8-bit register used exclusively for reading when the ACK/NAK transmission is carried out. When a value is written into this register, the data is delivered from the register during the next ACK/NAK transmission enabling period, as long as a transmission is not made when not required in a multiple address mode, a short message interruption is not made, or errors such as a data receiving error or write lost data error have not occurred. Further, the transmission cannot be extended over an adjacent packet. The control code register CCR is a read-write enable flag register for control, for example, when the upper 4 bits are made OH by a hexadecimal notation, mode 1 is selected, and if the upper 4 bits are made 6H, mode 2 is selected. Further, when a reset is released, the CCR flags except for the RES flag, are ignored.

FIG. 8 is a bit configuration diagram of the register CCR in mode 1, wherein bit 7 to bit 4 is an area indicating a mode 1, and when OH is written in this area it brought to the mode 1 state. Bit 3 is a short message interruption flag SMI, and when this flag is "1", a short message interruption occurs at the section enabling a short message interruption, for example, the MDR=8 section, by a long message. Further, a long message transmitted from the register CCR can be interrupted by itself, and a short message interruption can be made regardless of the transmission status. Further this flag is made "0" when the status counter (MDR) is made "1", or is made "2" during the synchronization recovery period.

Bit 2 is a reset flag RES. When this flag is made "0", all states are returned to the initial state and the operation is stopped. If this flag is made "0" during a transmission, the transmission is instantly halted, and any remaining bits are not transmitted. Further, when this flag is made "1", the operation is started, i.e., the synchronization recovery period is begun. When the reset terminal carries out reset, or the operation of the present IC is started from the time of a power-up of the device, "1" must be set from the processor 1.

Bit 1 is a receiving interruption mask flag RIM, and when this flag is "0", the receiving, short message interruption, data receiving error, read lost data, framing error, parity error, and ACK/NAK error interruption in the packet is stopped. Note, this flag masks the output of the IRQ terminal only, and the INTR flag itself may operate normally. Further, when this flag is "1", the interruption may occur normally. This flag is made "1" either when the status counter (MDR) is made "1" or when the synchronization recovery period is released after a non-data period on the bus has lasted for 10 ms+22 bits. But, even during the synchronization recovery period, an interruption may occur if "1" is written in this flag.

Bit 0 is a transmission interruption mask flag TIM, and when this flag is made "0", the interruption of a transmission, coincidence detection, and a writing of lost data in a packet is stopped. But this flag masks only the output of IRQ terminal, and the INTR flag may operate normally. Further, when the flag is "1", the interruption may occur normally. This flag is made "1"when the status counter (MDR) is made "1" or the non-data period on the bus has lasted for 10 ms+22 bits. But, even during the synchronization recovery period, an interruption may occur if "1" is written in this flag.

FIG. 9 is a bit configuration diagram of the register CCR in mode 2. When bit 7 to bit 4 is 0H, the mode goes to mode 2. In this mode, bit 1 is a multiple address WBRC, and when the flag is "1", the register operates thereafter as though the current transmitted-received packet is a multiple address packet. When the flag is "0", the operation is reversed and it is assumed that it is an individual packet.

Bit 0 is a long message flag LMES, and when the flag is "1", the register operates thereafter as though the current transmitted-received packet is a long message packet. When the flag is "0", the operation is reversed and it is assumed to be a short message packet.

The status register (STR1) 231 is a flag register used exclusively for reading the status of the bus or the packet and the like. FIG. 10 is a bit configuration diagram of the status register (STR1) 231.

Bit 7 is an interruption flag INTR. This flag signal is the same as that of the IRQ terminal, and is made "1" when an interruption of the data input/output is required, interrupting the CPU, i.e., the central processor unit 1. When the processor 1 reads the status register (STR1) 231, the IRQ terminal becomes HIGH, and the flag is made "0". The flag is made "1" when the status counter (MDR) is made "1" or when the status counter (MDR) is made "2" during the synchronization recovery period.

Bit 6 is a short message interruption flag RSMI. When a short message interruption is detected, i.e., when the stop bit becomes "0" at the data portion of a long message, the flag is made "1". Further, the flag is made "0" when the status counter (MDR) is made "1" or when the status counter (MDR) is made "2" during the synchronization recovery period. The determination of the long message is made by the "priority code", and when the flag is made "1", in other words, when a short message interruption occurs, a framing error flag FE is not set.

Bit 5 is a coincidence detection flag CD. The coincidence detection will be described later, but this flag is made "1" as a "coincidence detection" if the transmitted data has a different "priority code" and "self address" from those of the received data. Accordingly, when the parity bit and the stop bit are different, it is taken as a "coincidence detection".

Bit 4 is an in-transmitting flag TX, and is made "1" when data is transmitted. Further, this flag is made "0" when the status counter (MDR) is made "1" or when the status counter is made "2" during the synchronization recovery period, and is made "0" by a coincidence detection i.e., when CD flag is set, and by a short message interruption, i.e., at the portion where MDR is changed from 0 to 1 after the occurrence of the short message interruption. Nevertheless, assuming the initial value is 0, it is not made "1" during an ACK/NAK transmission after the data is received.

Bit 3 is an error flag ERR, and is made "1" when any one of the error flags (RDE, WLD, RLD, FE, PE, and AKE) of the status register (STR2) 229 are "1". This flag is the same as the STR2 error flag but with the OR thereof removed. Further, the flag is made "0" when the status register (STR2) 229 is read, when the status counter (MDR) is made "1", or when the status counter (MDR) is made "2" during the synchronization recovery period.

Bit 2 is a multiple address flag BRC. If the flag is "1", this indicates that the message received is a multiple address mode packet, and if the flag is "0", that the message received is an individual mode packet. The flag is set with the value of bit 6 of the priority code when the status counter (MDR) becomes "4", and further, is made "0" when the status counter (MDR) is made "1" or when the status counter (MDR) is made "2"during the synchronization recovery period.

Bit 1 is a data receive completion flag RXRDY, and is made "1" when data can be delivered to the processor 1, and when the processor has received the data, is made "0". Further, when the status counter (MDR) is made "1" or when the status counter (MDR) is made "2", the flag is made "0".

Bit 0 is a transmission completion flag TXRDY, and is made "1" when data can be received from the processor 1, and assuming that the initial value is 1, when data is received from the processor 1, is made "0".

The status register (STR2) 229 is a flag register used exclusively for reading to determine an error and the like on the bus or in a packet. FIG. 11 is a bit configuration diagram of the status register (STR2) 229, wherein bit 7 to bit 2 is an error flag set when an error occurs.

RDE and WLD are "0" when the register is read, or when the status counter (MDR) is made "2" during the synchronization recovery period, and RLD, FE, PE and AKE are "0" when the register is read, or when the status counter (MDR) is made "1", or when the status counter is made "2" during the synchronization recovery period.

Bit 7 is a data receiving error flag RDE, and synchronizes received data by a start bit at every character. If the start bit cannot be properly detected at that time, the flag is made "1". Further, when more data is received than a long message code, the flag is made "1", but the flag is not set by an ACK/NAK receiving error. Further, the synchronization recovery period begins when the flag is made "1".

Bit 6 is a write lost data flag WLD, and if character data is not written to the transmitted data register (TXDR) before the start of the transmission of the next character, the flag is made "1". When this error occurs, the transmission is stopped and the synchronization recovery period is started.

Bit 5 is a read lost data flag RLD, and when data is delivered from the bus while prior data remains in the receiving data register (RXDR), the flag is made "1". At this time, the value of RXDR is changed to new data, but if the flag is made "0" by reading the status register (STR2) 229 instead of the RXDR, the cause of the error is not cleared, and therefore, when the next interruption occurs, the flag is again set. The cause of error can be cleared by reading the RXDR (the initial value is 0).

Bit 4 is a framing error flag FE, and is made "1" if the stop bit is made "1" at a portion other than the data portion of a long text.

Bit 3 is a parity error flag PE, and if the parity check circuit 24 described above detects a parity error, this flag is made "1". Here, the even parity is used.

Bit 2 is an ACK/NAK error flag AKE, and is made "1" if the start bit of ACK/NAK cannot be detected within a time of ±13 $\mu$s.

Bit 0 is a synchronization recovery period flag DRE, and is made "1" directly after the reset or when the data receiving error (RDE) or the write lost data error (WLD) occurs, and starts the synchronization recovery period. When the synchronization recovery period ends, the flag is made "0" and the mode changed to the normal mode.

The register 219 (status counter) MDR indicates the state of the packet received on the bus. This register is used exclusively for reading the values from 0 (00H) to 11 (0BH), and transmits or receives data, i.e., information, in packet units consisting of a plurality of codes, and the status counter MDR indicates the transmitted-received state of these codes. FIGS. 12 to 15 are diagrams for describing the states of the status counter, wherein each diagram shows the value of the status counter and the state of bus data when the INTR flag is set. The previous value of the status counter is maintained between start bits.

Figure 17B:
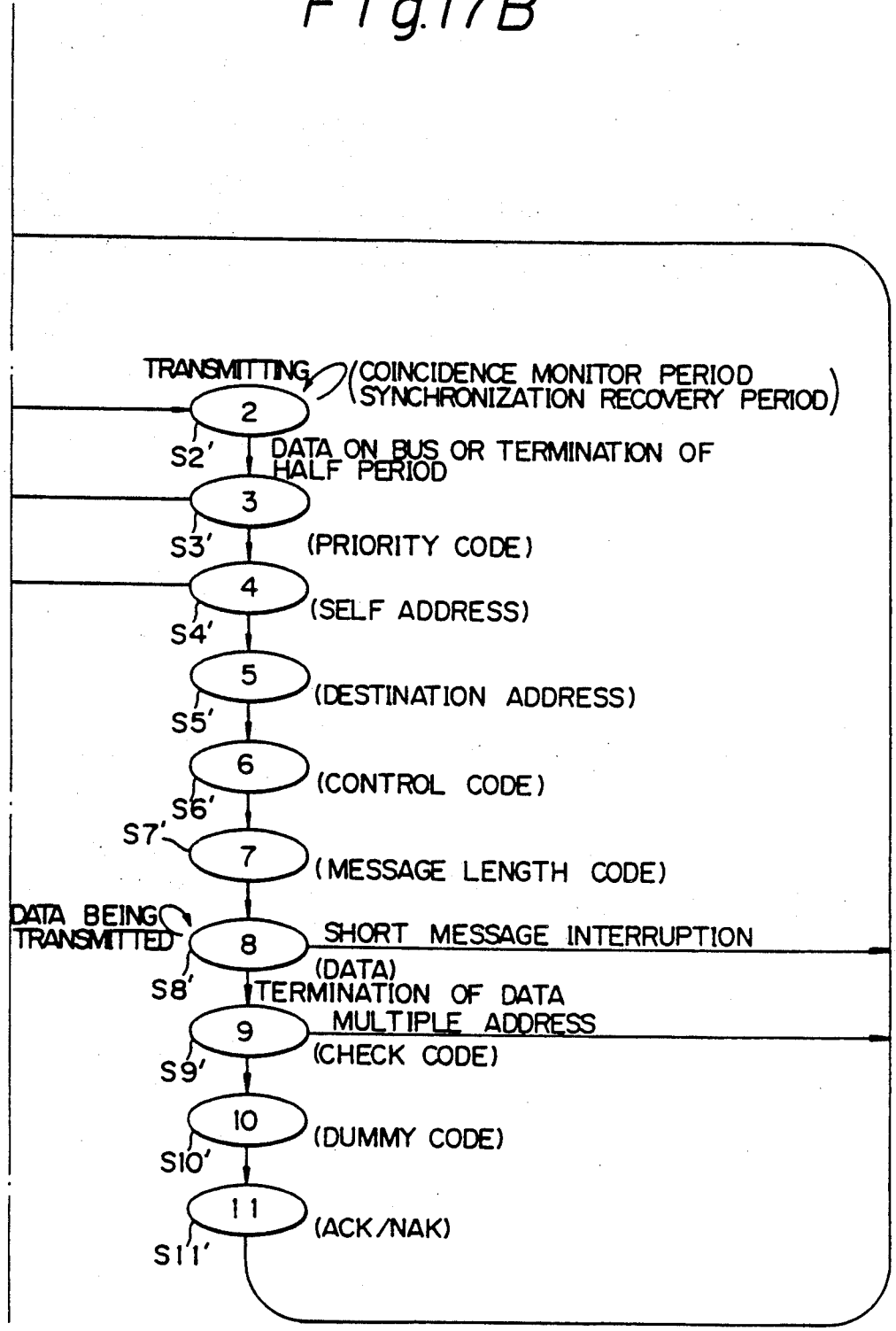
FIG. 17 is a chart showing the transition of the state of the protocol control circuit.

The bit counter 235, edge detection circuit 217, halt counter 218 and short message interruption detection circuit 222 are connected to the status counter, i.e., the register 219. The bit counter 235 is supplied with signals, not shown, from the sampling circuit 220 and the RX shift register 223, and requests the position of the bit received. The current status is requested by the bit detection signal of the data received from this bit counter 235. FIG. 16 shows the states in correspondence with the count of the status counter, and FIG. 17 shows a chart of the state transitions. When the count of the status counter is 0, i.e., the reset release state S0 exists, a state that data exists on the bus, or a bus vacancy detection period of 22 bits or 44 bits exists is assumed. In the state S0, the period of from 10 msec to the time corresponding to 22 bits, i.e., 208 $\mu$sec., after the time when no data is received is the halt period (state S1), and after this period, the flows goes to the state S2.

The output of the bit counter 235, the edge detection circuit 217, and the packet state register 239 are supplied to the halt counter 218, and based on these outputs, the halt counter 218 determines the halt period.

In the first half of the halt period, i.e., the status counter (MDR) 219 is "0", even though data exist on the bus, this data is not considered to be a packet. When a data-less period continues for 22 bits in a normal mode, and for 44 bits in the multiple address mode, a change is made to the next state. This is used to carry out a synchronization adjustment of a packet wherein the "text length code" and actual data length are not synchronized, or a synchronization adjustment just after a reset.

When transmitting, the transmitting is started after the halt period has elapsed. But, if another device commences transmitting during the coincidence monitoring period, the transmitting from the present device is started in accordance with the transmitting from the other device.

When data is delivered while the status counter 219 is "0", a data receiving error state exists, and the synchronization recovery period is started. The status counter 219 then is made "2".

When the status counter 219 is made "2", if a transmission request is supplied from the data bus, the S2 state exists. Further, the value of the status counter 219 does not change at that time. The S2 state is either the coincidence monitoring period or the data delivery waiting state. When data exists on the bus, states S3, S4, S5, S6, and S7 are passed successively, i.e., the value of the status counter 219 changes in order from 3 to 7, and finally reaches the state S8.

The states S3, S4, S5, S6, and S7 are the priority code period, the self address code period, the destination address code period, the control code period, and the message length code period, respectively, corresponding to the priority code, the self address code, the destination address code, the control code, and the message length code of the packet. The states $S_2$ to $S_8$ are the states for receiving data, and when an own address is received in the destination address period, the receiving state is applied.

State S8 is the data period. In this state, if a short message interruption exists in the data, i.e., in the information, the status counter 219 is made "0", i.e., the state S0 exists.

As shown in FIG. 30, the state S8 of the output of the status counter 219 and the stop bit signal detection of both the receiving data $\overline{RXD}$ and the bit counter 235, are supplied to the short message interruption detection circuit 222, and then "0" is fed from the AND circuit AND when the value of the status counter 219 is 8 at the position of the stop bit, and when the receiving data is "0" (to be changed to "1" by reversal), these outputs are supplied to the status register (STR1) 231, and accordingly, the short message interruption can be detected.

In the data bus system, a short message interruption may be output from a device connected to the data bus. In the data bus system, the short message interruption can be executed when the device interrupting the stop bit SP outputs "0", i.e., generates pulses. The short message interruption detecting circuit 22 detects the short message interruption mentioned above. Namely, when the short message interruption detection circuit 222 detects an interruption, the detection signal is supplied and resets the status counter 219 to "0" (state S0). Further at the same time, the interruption detection signal is delivered to the transmission control portion 233, and the transmission control is then stopped. Also at the same time, the short message interruption detection signal is supplied to the status register (STR1) 231 to make the short message interruption flag RSM of bit 6 ON, i.e., to "1".

When the data period, for example, during transmission a period for receiving data, has elapsed, the state S9 exists. The state S9 is the check code period, and after receiving the check code, the state S10 exists and the dummy code period is started. In the multiple address mode, the state S0 exists, i.e., the value of the status counter is "0". The dummy code period is followed by the ACK/NAK period, and an ACK/NAK signal is delivered during this period, and thereafter the state S0 exists. When a transmission is requested while the state S2 exists, the state S2 is maintained, and the value of the status counter does not change, and thereafter, the state S3 exists, i.e., the priority code period is started.

Figure 18:
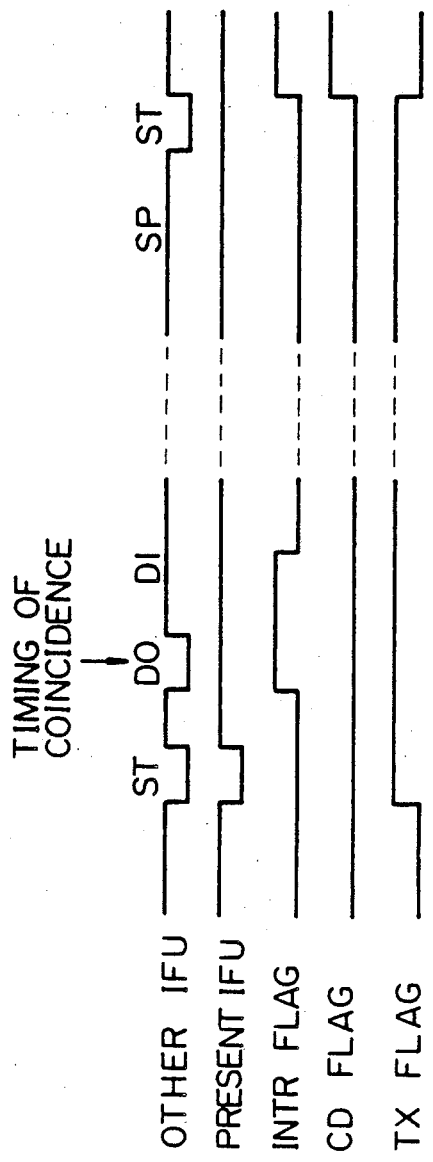
FIG. 18 shows the signal waveforms for illustrating the occurrence of a coincidence.

If transmission requests are generated from a plurality of devices at the same time, and data and the like are delivered at the same time, a conflict exists. To measure the state of this conflict in the data bus, the devices are given a priority, and the system is arranged such that the devices with a higher priority are given preference over devices with a lower priority, when the devices are in competition with each other due to the existence of a conflict. The priority is determined by the priority code, which consists of a total of 8 bits from D0 to D7, in which "00000000" is the highest and "11111111" is the lowest. When devices with a high priority and with a low priority deliver priority codes at the same time during the priority code period, all bits are supplied on the bus at the same time. Although each bit is delivered on the bus at the same time, as described above, the pulse generated in the data bus is "0" and a "1" pulse cannot be generated, and therefore, the device delivering a "0" compulsorily makes the bit of the data bus "0". On the other hand, the device with a lower priority delivers a "1", and thus differs from the data on the bus. The coincidence detection circuit 221 detects this data difference when the serial output SO of the TX shift register 225 and the receiving signal $\overline{RXD}$ of the data bus driver/receiver 3 are supplied thereto. Namely, the coincidence detection circuit 221 compares these two signals, i.e., the receiving signal $\overline{RXD}$ and the serial output SO, and if the SO and the receiving signal RXD coincide, either the device has a high priority or a conflict does not exist, and therefore, it is determined that a coincidence has not been detected. On the other hand if the priority code of another device is higher than the priority code of the current device, the code of the other device having a higher priority code is supplied as a receiving signal $\overline{RXD}$, and thus the coincidence detection circuit 221 detects a discord, i.e., detects the delivery of a higher level priority code, and applies a discord signal to the transmission control portion 233. In response to this signal, the transmission control portion 233 stops the delivery of the currently delivered priority code, and at the same time, the transmission control portion 233 informs the status register (STR1) 231 of the detection of a coincidence. That is, bit 5 of the status register (STR1) 231, which is the coincidence detection flag CD is made "1". FIG. 18 is a diagram for explaining this coincidence. The high level priority code is delivered from another IFU device and the low level priority code is delivered from the current IFU device, and since the current device does not deliver the "0" in the code D0, the coincidence detected state exists. Depending on this coincidence detection, the INTR flag of the current device is made ON at next start bit, and the transmission flag is made OFF at next start bit after the coincidence detection. For example, when the interruption is released, an interruption $\overline{IRQ}$ is supplied to the processor 1.

Flag information is supplied to the interruption control portion 236, and flag information of the status register (STR1) 231 is also supplied to the interruption control portion 236. The interruption control portion 236 informs the processor 1 that this information is an interruption signal $\overline{IRQ}$ via the buffer circuit 215.

As shown in FIG. 17, in state S3', if a coincidence occurs, subsequent transmission becomes impossible and the state is moved to the state S3, which is a receiving state.

FIG. 29 shows a logic circuit diagram of a coincidence detection circuit 221. When the value of the status counter 219 is either S3 or S4 during a transmission, a HIGH signal "1" is applied to the AND circuit. Further, the received data $\overline{RXD}$ and the received data SO are supplied to the EOR circuit, and the output thereof is supplied to the AND circuit. If the status counter 219 is 3 or 4 during a transmission, and if the received data differs from the transmitted data, the coincidence detection signal is supplied from the AND circuit to the status register (STR1) 231 and stored therein. The coincidence is detected by the operation procedure described above.

On the other hand, if a coincidence does not occur, the state S4' exists, and the self address period is started. During the self address period, the self address to be transmitted by, for example, the circuit shown in FIG. 3, is the self address of the present device, but even in the self address period, a coincidence may occur as mentioned above. For example, if a plurality of devices having the same priority code exist on one data bus, they coincide in the priority code period, but the coincidence does not occur for each of the devices, and therefore, the coincidence is detected again in the self address period. Two similar addresses can not exist on one data bus, and thus the coincidence is easily detected by the detection in the self address period. This coincidence is detected by the coincidence detection circuit 221 by the same operation procedure as described above. If a coincidence occurs in the state S4', the state S4 of the above receiving state exists.

If a coincidence does not occur, the state is moved to the state S5' which is a state for transmitting a destination address to which the data is to be transmitted, i.e., the state of the destination address period. When the transmission of the destination address is completed, the control code and the message length code are successively transmitted in the control code period (state S6') and the message length code period (state S7'). After that, the data, i.e., the information is delivered. This data delivery is carried out during the data period (state S8'). During the data transmitting (state S8'), as during the data receiving (state S8), a short message interruption from another device may occur, and when the short message interruption occurs, as in the receiving state, the short message interruption detection circuit 222 detects the short message interruption, and makes the status counter 219 0, i.e., the state S0 exists at that time. When the data ends in the data period (state S8'), the state is moved to the check code period (state S9'), and the check code is delivered. Then, through the dummy code period (state S10'), the state is moved to the ACK/NAK period to receive the ACK and/or NAK signals from the receiving device, and becomes the state S0.

All of the above described changes of count of the status counter 219 are carried out on the basis of the data edge signal from the edge detection circuit 217.

There are cases where the condition is not satisfied and, therefore, the count is not changed. For example, in the data transmitting or receiving period (state S8', state S8), the state will not be moved until all of the data transmitting or receiving is completed or the short message interruption occurs. The period of state S1 is detected by the timer 238, and when a completion signal is supplied to the status counter, the count of the status counter is changed. The signal of the timer 238 is supplied to the transmitting control portion 233, and the transmitting control of the transmitting control portion 233 is started by the completion signal supplied from the timer 238.

The parallel outputs from the RX shift register 223 are supplied to the packet status register 239. The packet status register 239 is a circuit for detecting the packet state to transmit/receive the data. The states can be state individual, multiple address, short message, synchronization recovery, or the like. These state signals are supplied to the status register 219 via the halt counter 218, and then the status counter 219 changes in correspondence with these states. FIGS. 12 to 15 are the explanatory diagrams of the operations of status counter when the individual, multiple address, synchronization recovery period, or ACK/NAK error states exist. In each case, the count of the status counter 219 is changed according to the sequence: 0, 1, 2, 3, 4, 5, 6, 7, 8, and 9. The bus data is changed successively to, for example, a priority code, self address, destination address, control code, message length code, data, and check code, in 3 to 9 of these drawings, with regard to the synchronization recovery period, the dummy code period and ACK/NAK period are shown as 10 and 11 in these drawings in the individual mode. The device of an embodiment of the present invention carries out the synchronization recovery during the synchronization recovery period. During the synchronization recovery period, the bus data is successively changed. For example, the bus data is a data transmission between other devices. A state may occur in which no data is transmitted between other devices, no data is transmitted, and no change of bus data occurs. In the multiple address mode, the data becomes "0", after the check code period. This is because the delivery of ACK/NAK signal is not necessary. In this case, neither a dummy code period nor an ACK/NAK period exists, and the next bit to 9 becomes 0. When an error occurs during the ACK/NAK signal period, the state of 10 of the status counter 219 is not successively changed. In this case, the state of 10 of the status counter 219 goes directly to the state of 0.

The parallel output of the RX shift register 223 is applied to the message length counter (MLC) 250. The message length counter (MLC) 250 receives the parallel output of the RX shift register 223 when the state of the status register 219 is 7 (state S7) in the receiving state, and carries out a decrement each time one data is received in state S8. For example, by reading the data of this message length counter (MLC) 250 from the processor 1, it is determined how much additional data should be received. FIG. 28 is an explanatory diagram of the operations of the bus data and the message length counter (MLC) 250. When a message length data n is received, this n is loaded to the message length counter (MLC) 250, and then the count is decremented by 1 each time a data is received in state S9; the count becomes 0 when a predetermined code is received.

During transmitting of data the preparation of the transmission is completed by writing data to the transmission data register (TXDR) (FIG. 19 (1)). In the case of a long message, the data can be transmissed successively by an interruption by setting the SMI flag. When the states become transmittable, the transmission is started automatically (FIG. 19 (2)). After that, the TXRDY flag and INTR flag become "1" to realize an interruption, and a request for the next transmission data, i.e., the self address, is raised to the processor (FIG. 19 (3)). After that, the writing of transmission data is repeated. When the transmission data is a check code, the next transmission/reception of one character (dummy code) is stopped (FIG. 19 (4)), and the transmission/reception of ACK/NAK is carried out. Further, the delivery of the transmission data to the processor 1 is completed when the last character of the data a portion is transmitted (FIG. 19 (5)). After that, the data is written into TXDR, and the character at the beginning of the next packet, that is the priority code is realized.

The receiving operation is carried out simultaneously with the transmission operation, and therefore, an interruption may occur after the transmission of the "priority code" (FIG. 19 (6)).

Figure 20B:
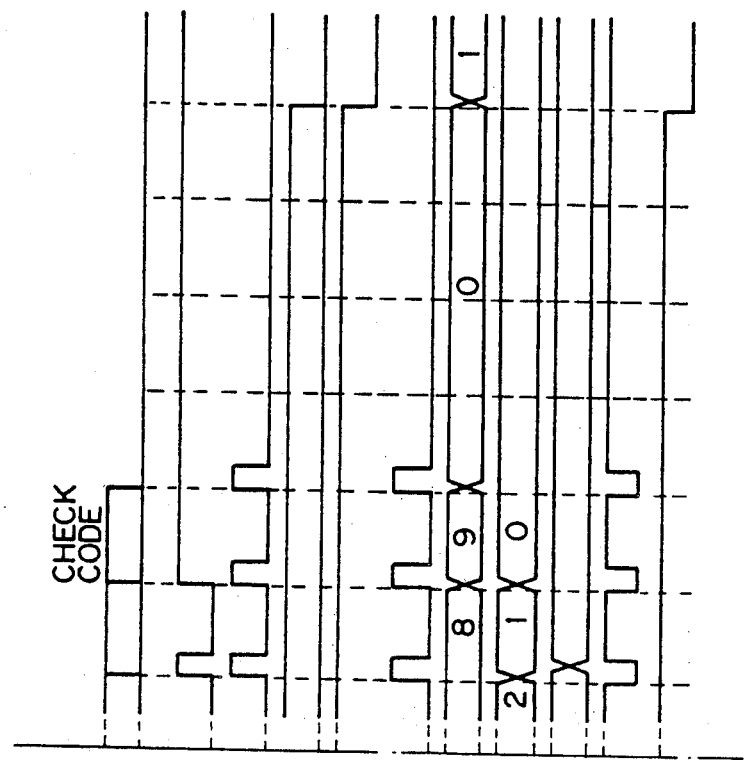
FIG. 20 shows the waveforms for illustrating the data transmitting operation in the multiple address mode.
Figure 23B:
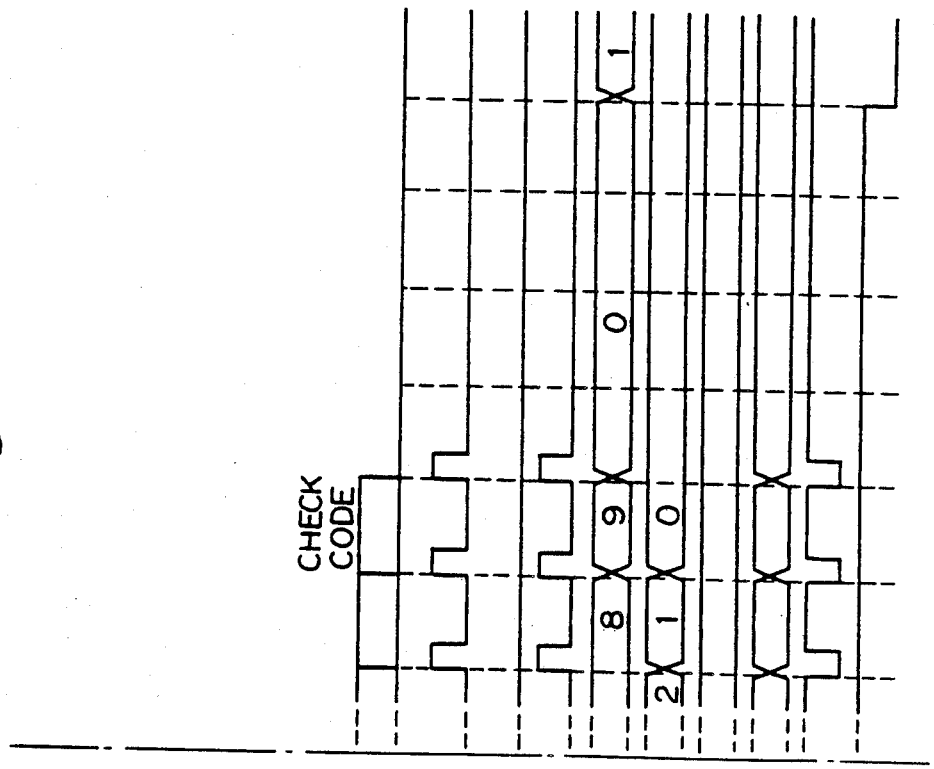
FIG. 23 shows the waveforms for illustrating the data receiving operation in the multiple address mode.

The transmitting operation in the multiple address mode is similar to that in the individual mode, except for the absence of the receiving of ACK/NAK, as shown in FIG. 20. The receiving operation is started when the data is received. After receiving one character, the RXRDY flag and INTR flag become "1", and the interruption IRQ is generated, and accordingly, the processor 1 is requested to carry out an input of data. The received data is delivered to the processor 1 after the reception of one character, and therefore, the first character, i.e., the priority code, is delivered to the processor 1 when MDR = -4 (FIG. 21 (7)), and the last data is delivered when MDR = 0 (FIG. 21 (8)). The transmission of ACK/NAK is carried out by AKR. However, no particular register is provided for receiving the ACK/NAK, and the receiving is carried out by RXDR as in the case of other data. Furthermore, the determination of a multiple address and a long message is carried out by the "priority code", as shown in FIG. 22. As shown in FIG. 23, the reception operation in a multiple address transmission is the same as the reception operation shown in FIG. 21 except that there is no transmission of ACK/NAK as in the individual reception.

The ACK/NAK transmission operation is carried out by providing a register exclusively for delivering ACK/NAK, and by setting the data to the ACK/NAK transmission register (AKR) normally after the reception of the check code (FIG. 21 (9)). While the data is being transmitted or received, the transmission of data is carried out whenever the setting of data is carried out. However, in the case of a multiple address and short message interruption, no transmission is carried out even if the data has been set.

In the operation during the synchronization recovery period, when the reset flag (RES) is changed from "0" to "1" (when reset is released), and when the data reception error, or the write lost data error occurs, the synchronization recovery period is started. At that time, the transmission/reception interruption mask flag becomes "0", and no interruption to the processor 1 is generated. When the synchronization recovery period is completed, the flags become "1" to allow the generation of an interruption. The transmission is not carried out during the synchronization recovery period.

In the synchronization recovery period, the count of the status counter (MDR) is changed from "0" to "2". When data is received under the condition that the count of the status counter (MDR) is "0", the data is received, but the received data is not acknowledged as a packet but is regarded as a receiving error (RDE). When the data is received under the condition that the count of the status counter (MDR) is "2", the data is received and the operation of the synchronization recovery is carried out.

The above-mentioned operation is completed with the condition either (1) to receive one normal packet without parity error (PE) in the synchronization recovery period, or (2) to allow an elapse of a period of 10 ms plus 22 bits without data on the bus. However, the packet in which a parity error (PE) occurs under the condition (1) is treated as a non-synchronization packet and the synchronization recovery period is continued until the condition (1) or (2) is established. Six errors: receiving data error (RDE), write lost data error (WLD), read lost data error (RLD), framing error (FE), parity error (PE), and ACK/NAK error (AKE) are detected. When a framing error (FE) or parity error (PE) occurs, the flag is made "1" and the processor 1 is informed of the error by interruption, and the receiving operation is continued.

The write lost data error (WLD) or read lost data error (RLD) is checked when the next data is transmitted or received.

When the error is detected, the flag is made "1", and the processor 1 is informed of the error. When the read lost data error (RLD) occurs, the receiving operation is continued. When the write lost data error (WLD) occurs, the transmitting operation is stopped, and the above-mentioned synchronization recovery period is started.

When the data reception error (RDE) occurs, the flag is made "1" to generate an interruption, the count of the status counter (MDR) is made "0", the synchronization recovery flag (DRE) is made "1", and accordingly, the synchronization recovery period is started.

When ACK/NAK error occurs, the flag is made "1" and an interruption is carried out. If this error occurs, the status counter (MDR) changes from "10" to "10", and to "0"; i.e., if the ACK/NAK is not detected, the period of MDR = 10 becomes 22 bits.

In each case of the above-mentioned error flags, the flag becomes "0" either when the status register (STR2) 229 is read, or when the status counter (MDR) is made "1", or during the synchronization recovery period, when the status counter (MDR) is made "2".

Each of the transmission data input, reception data output, short text interruption, coincidence, and error constitutes the cause of interruptions of the processor 1.

The cause of the interruption can be detected on the basis of the TXRDY flag, RXRDY flag, short message interruption flag, coincidence detection flag, error flag, or the status register (SRT2) 229. A resetting from an interruption can be carried out by reading the interruption flag for any of the above-described causes.

Figure 24A:
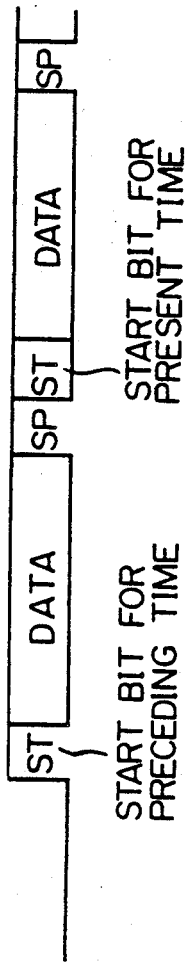
FIG. 24A shows the waveform of the start bit, the data, and the stop bit.
Figure 24B:
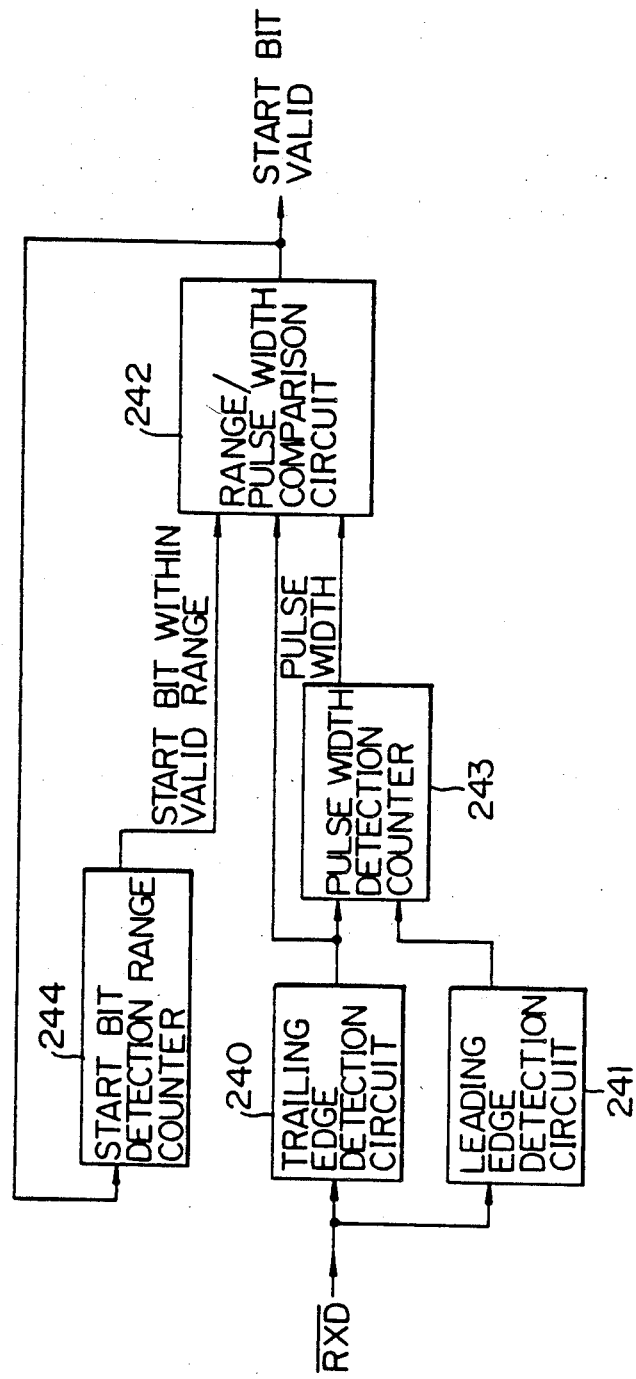
FIG. 24B shows the start bit detection circuit used for the protocol control circuit.
Figure 26:
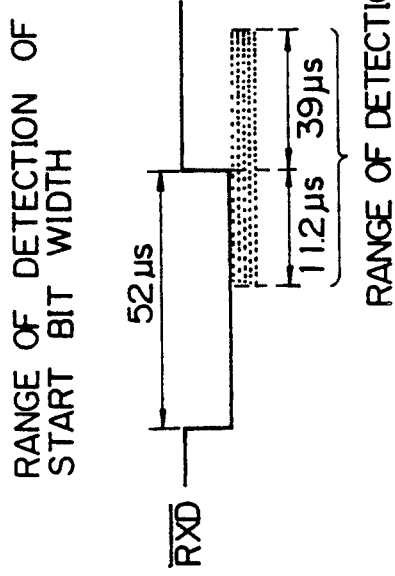
FIG. 26 illustrates the range of detection of the timing of the start bit.

In the circuit shown in FIG. 3, the edge detection circuit 217 is a circuit for detecting the edge of data, i.e., the start bit. This circuit eliminate noises by defining the range of detection of the start bit or the width thereof. This circuit is used for indicating the data receiving error concerning the erroneous message. FIG. 24B is a circuit diagram of a start bit detection circuit, i.e. the data edge detection circuit 217. The function of this circuit is to detect the range of detection of the start bit position and the range of detection of the start bit width, and determine whether or not the start bit exists within the above detected ranges. The reception signal $\overline{RXD}$ is applied to the trailing edge detection circuit 240 and the leading edge detection circuit 241. Outputs of both the trailing edge detection circuit 240 and the leading edge detection circuit 241 are supplied to the pulse width detection counter 243; the pulse width detection counter 243 carries out the counting operation during the time period from the trailing edge to the leading edge of reception signal, and counts the number of master clocks, and supplies the count during the period to the range/pulse-width comparison circuit 242. FIG. 26 illustrates a range of detection of the start bit width. It is prescribed that the start bit should fall within the range of 52 μsec. +39 μsec., −11.2 μsec. from the trailing edge, and the range/pulse-width comparison circuit 242 determines that the data which comes within this range is a start bit. Then, a start bit validity signal, i.e., the data edge detection signal, is delivered. The start bit validity signal is also applied to the start bit detection range counter 244, and when the start bit becomes effective, the counting operation is started, and when the count number becomes within the specific range a signal indicating the range is applied to the range-pulse width comparison circuit 242. The output of the trailing edge detection circuit 240 is supplied to the range/pulse-width comparison circuit 242, and the range/pulse-width comparison circuit 242 detects whether or not the detection signal from the trailing detection circuit 240 exists within the range indicated by a start bit validity range indication signal delivered from the start bit detection range counter 244. If an indication occurs, the pulse at the time when the trailing edge is detected from the trailing edge detecting circuit 240 is supplied as a HIGH signal to the range/pulse-width comparison circuit 242. If a signal which becomes HIGH when the timing is within the range is supplied from the start bit detection range counter 244, the range/pulse-width comparison circuit 242 obtains the AND logic of these two signals, and if the result is "H", and further, when the pulse width falls within the prescribed width, a start bit validity signal is delivered.

Figure 25:
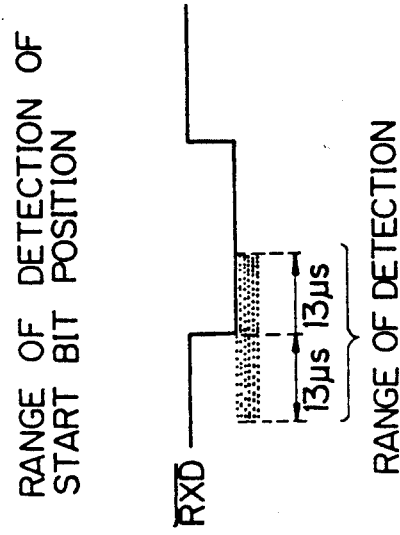
FIG. 25 illustrates the range of detection of the width of the start bit.

The above mentioned start bit validity range represents the range of trailing edge position of the start bit, and, as shown in FIG. 25, the period of ±13 μsec from the position where the trailing edge of the start bit is to be supplied is defined as valid. Further, the start bit detection is carried out not for the whole data but, as shown in FIG. 27, for the range from X1 to X9.

Due to the operation of the above-described start bit detection circuit, the prevention of noise is attained, and the data reception error flag is made ON for erroneous messages, so that the effectiveness of the data is remarkably enhanced.

What is claimed is:

1. A protocol control circuit for a data bus system in which data is communicated through a data bus and an acknowledgement signal is transmitted from a receiving unit through the data bus to a transmitting unit when data from the transmitting unit is received by the receiving unit, said protocol control circuit comprising a buffer register unit including:
   a transmitting buffer register for storing at least one unit of data to be transmitted;
   an acknowledgement buffer register for storing the acknowledgement signal; and
   a selector, connected to said transmitting buffer register and said acknowledgement buffer register, for switching between transmission of an output signal from said transmitting buffer register and transmission of the acknowledgement signal from said acknowledgement buffer register in dependence upon timing for delivery of the acknowledgement signal.

2. A protocol control circuit for a data bus system in which data is communicated through a data bus and an acknowledgement signal is transmitted from a receiving unit through the data bus to a transmitting unit when data from the transmitting unit is received by the receiving unit, said protocol control circuit comprising:
   a signal transmitting and receiving circuit connected through a bus driver/receiver unit to the data bus for transmitting signals to and receiving signals from the bus driver/receiver unit;
   a status counter register for indicating a currently transmitted or received code in a packet constituted by a plurality of codes communicated through the data bus;
   a packet status register for indicating an individual mode or a multiple address mode of a packet; and
   circuit arrangements for discriminating between the individual mode and the multiple address mode of a transmitted or received packet based on the content of said packet status register, and transmitting or receiving through said signal transmitting and receiving circuit a corresponding code in accordance with the result of the discrimination and the content of said packet status register.

3. A protocol control circuit for a data bus system in which data is communicated through a data bus and an acknowledge signal is transmitted from a receiving unit through the data bus to a transmitting unit when data from the transmitting unit is received by the receiving unit, said protocol control circuit comprising:
   a signal transmitting and receiving circuit connected through a bus driver/receiver unit to the data bus for transmitting signals to and receiving signals from the bus driver/receiver unit;
   a status counter register for indicating a currently transmitted or received code in a packet constituted by a plurality of codes communicated through the data bus;
   an edge detecting circuit having a start-bit detecting counter for detecting a start-bit;
   a clock generating circuit for generating a sampling clock signal at a sampling position of each bit; and
   circuit arrangements for transmitting or receiving through said signal transmitting and receiving circuit a code indicated by said status counter register using the sampling clock signal generated in said clock generating circuit.

4. A protocol control circuit for a data bus system in which data is communicated through a data bus and an acknowledgement signal is transmitted from a receiving unit through the data bus to a transmitting unit when data from the transmitting unit is received by the receiving unit, said protocol control circuit comprising:
   a signal transmitting and receiving circuit connected through a bus driver/receiver unit to the data bus for transmitting signals to and receiving signals from the bus driver/receiver unit;
   an edge detecting circuit having a start-bit detecting counter for detecting a start-bit;
   a clock generating circuit for generating a sampling clock signal at a sampling position of each bit;
   a packet status register for indicating one of a long message nature and a short message nature of a packet; and
   circuit arrangements for discriminating between the long message nature and the short message nature of the packet based on the content of said packet status register, and transmitting or receiving through said signal transmitting and receiving circuit a long message or a short message using the sampling clock signals generated by said clock generating circuit.

5. A protocol control circuit according to claim 1, further comprising an edge detecting circuit having:
   a pulse timing detecting counter for detecting timing of a start-bit of received serial data;
   a pulse width detecting counter for detecting pulse width of the start-bit of the received serial data; and
   a pulse timing and width comparing circuit for receiving results of detections by said pulse timing detecting counter and said pulse width detecting counter, detecting whether the pulse width of the start-bit is a predetermined pulse width, detecting whether the timing of the start-bit is within a predetermined time period, and producing an effective start-bit signal when the results of said pulse width detection and said start-bit timing detection are affirmative.

* * * * *